United States Patent [19]
Okada et al.

[11] Patent Number: 5,668,601
[45] Date of Patent: Sep. 16, 1997

[54] AUDIO/VIDEO DECODING SYSTEM

[75] Inventors: Shigeyuki Okada, Hashima; Hideki Yamauchi, Ogaki, both of Japan

[73] Assignee: Sanyo Electric Co., Ltd., Moriguchi, Japan

[21] Appl. No.: 387,581

[22] Filed: Feb. 13, 1995

[30] Foreign Application Priority Data

| Feb. 17, 1994 | [JP] | Japan | 6-020653 |
| Nov. 30, 1994 | [JP] | Japan | 6-297346 |
| Dec. 20, 1994 | [JP] | Japan | 6-317114 |

[51] Int. Cl.$^6$ .................................... H04N 2/62
[52] U.S. Cl. ............................ 348/423; 370/503
[58] Field of Search .............. 348/423; 370/100.1, 370/503; H04N 7/62

[56] References Cited

U.S. PATENT DOCUMENTS

| 5,396,497 | 3/1995 | Veltman | 348/423 |
| 5,521,922 | 5/1996 | Fujinami | 348/423 |

FOREIGN PATENT DOCUMENTS

| 0 418 396 A1 | 3/1991 | European Pat. Off. |
| 0 577 216 A1 | 1/1994 | European Pat. Off. |
| 0 577 329 A1 | 1/1994 | European Pat. Off. |
| 0 602 943 A3 | 6/1994 | European Pat. Off. |
| 0 618 728 A3 | 10/1994 | European Pat. Off. |
| 0 648 056 A3 | 4/1995 | European Pat. Off. |

OTHER PUBLICATIONS

Patent Abstracts of Japan, vol. 14, No. 187, Apr. 16, 1990, JP2035886.

Macinnis, "The MPEG Systems Specification: Multiplex, Coding, and Constraints", 1992 SID International Symposium, May 1992, pp. 127–129.

*Primary Examiner*—Howard W. Britton
*Attorney, Agent, or Firm*—Sheridan Ross P.C.

[57] ABSTRACT

An audio/video decoding system capable of providing sufficient synchronization between an audio output and a video output. The decoding system has a parser, an audio decoder and a video decoder. The parser extracts an SCR (System Clock Reference), an audio time stamp and a video time stamp from a system stream, and demultiplexing the system stream into an audio stream and a video stream. The audio decoder computes an output timing for an audio output based on its decoding time, the SCR and the audio time stamp, and decodes the audio stream in accordance with the output timing. The video decoder computes an output timing for a video output based on its decoding time, the SCR and the video time stamp, and decodes the video stream in accordance with the output timing.

49 Claims, 14 Drawing Sheets

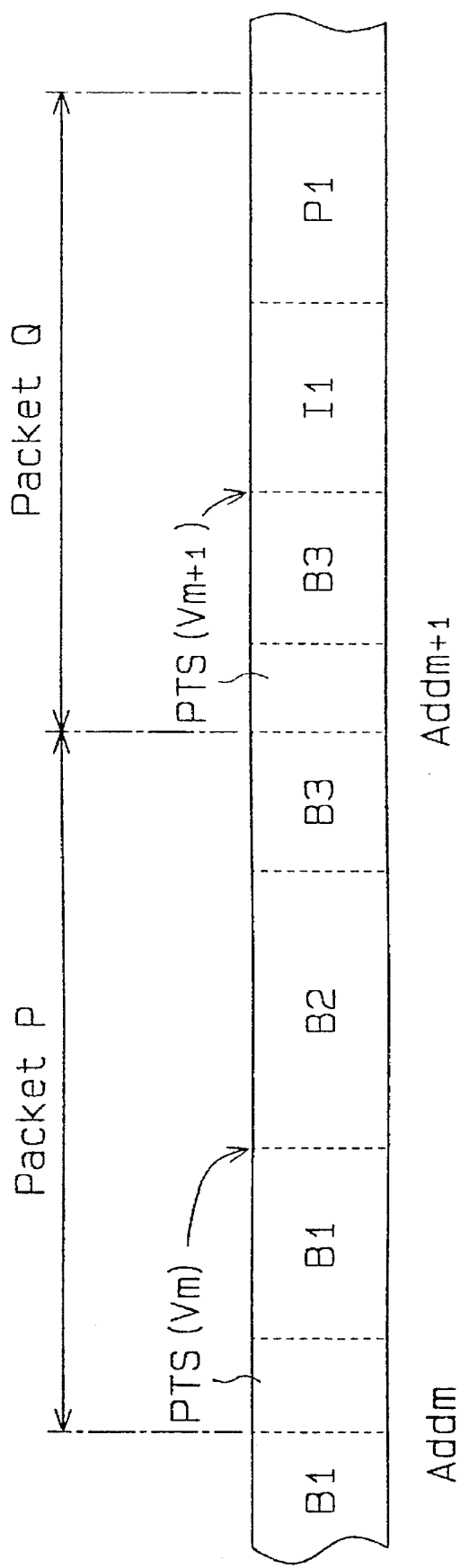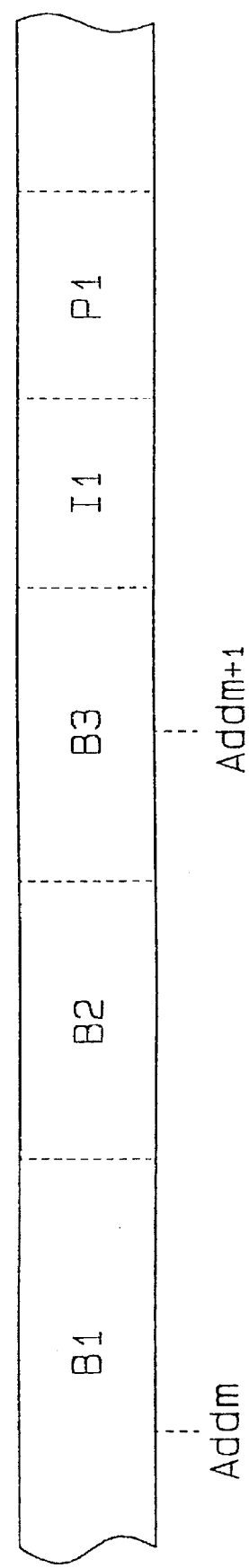

AUDIO/VIDEO DECODING SYSTEM

BACKGROUND OF THE INVENTION

1. Field of the Invention

The present invention relates generally to an audio/video decoding system which conforms to the MPEG (Moving Picture Experts Group) standards. More particularly, this invention relates to an audio/video decoding system that synchronizes the output of audio and video data to compensate for the time delays when decoding audio and video stream according to MPEG standards.

2. Description of the Related Art

Wide spread use of multimedia recording formats in personal computer, business and home entertainment systems has highlighted the need to process digitally recorded video and audio information at increasingly faster rates. This need for faster information processing has been accompanied by developments in data compression and expansion techniques that directly effect processing speed. Many types of multimedia recording formats in fact utilize data compression and expansion to enhance processing speeds. The "MPEG" standards are one popular type of standard that defines and governs data compression and expansion techniques. Current MPEG standards are continuing to be established by the MPEG Committee (ISO/IEC JTC1/SC29/WG11) under the ISO (International Organization for Standardization)/IEC (International Electrotechnical Commission).

The MPEG consists of three parts. In part 1 (ISO/IEC IS 11172-1), the MPEG defines a "system" or way of synchronizing and multiplexing the; video and audio data. In part 2, (ISO/ICE IS 11172-2), the MPEG defines video standards that govern the format and encoding process for video data and govern decoding process for a video bitstream. In part 3 (ISO/IEC IS 11172-3), the MPEG defines audio standards that govern the format and encoding process for audio data and govern decoding process for an audio bitstream.

At present, there are two MPEG standards, MPEG-1 and MPEG-2, which differ from each other principally in the rate which video and audio data are encoded. Video data, handled according to MPEG video standards, contains dynamic images, each of which consist of several tens (e.g., 30) of frames per second. This video data has a six-layered structure: a sequence of Groups of Pictures (GOP), individual GOPs, containing a plurality of pictures, a collection of slices within each picture, a macroblock within each slice, and a plurality of blocks within each macroblock. In the MPEG-1, frames are associated with pictures. In the MPEG-2, a frame or a field may but need not be associated with a picture. That is, MPEG-1 standards utilize only frame structure, whereas MPEG-2 standards may utilize both frame and field structures. Two fields constitute one frame. The structure where a frame is associated with a picture is called a frame structure, whereas the structure where a field is associated with a picture is called a field structure.

In the MPEG, a compression technique called an inter-frame coding is employed. The intra-frame coding compresses inter-frame data based on a chronological correlation of frames. A bidirectional prediction is performed to obtain the inter-frame coding. This bidirectional prediction uses both the forward prediction for predicting a current (or present) reproduction image from a past reproduction image (or picture) and the backward prediction for predicting a current reproduction image from a future reproduction image.

The bidirectional prediction defines three types of pictures called "I (Intra-coded) picture, P (Predictive-coded) picture and B (Bidirectionally predictive-coded) picture". An I picture is produced independently irrespective of a past or future reproduction image. A P picture is produced by forward prediction (prediction from a past I picture or P picture). A B picture is produced by the bidirectional prediction. In the bidirectional prediction, a B picture is produced by one of the following three predictions:

(1) Prediction from a past I picture or P picture;
(2) Prediction from a future I picture or P picture; and
(3) Prediction from past and future I pictures or P pictures.

Each I picture is produced without a past picture or a future picture, whereas every P picture is produced without a past picture and every B picture is produced with a past or future picture. The individual I, P and B pictures are then separately encoded.

In the inter-frame prediction, an I picture is periodically produced first. Then, a frame, several frames ahead of the I picture, is produced as a P picture. This P picture is produced by the prediction in one direction from the past to the future (i.e., in a forward direction). Next, a frame located before the I picture and after the P picture is produced as a B picture. At the time this B picture is produced, an optimal prediction scheme is selected from among either the forward, backward or bidirectional prediction schemes.

In general, a current image differs only slightly from its preceding and succeeding images in a consecutive dynamic image. It is assumed that the previous frame (e.g., I picture) and the next frame (e.g., P picture) are virtually the same. Should a slight difference exist between consecutive frames (i.e., in the B picture) the difference is extracted and compressed. Accordingly, inter-frame data can be compressed based on the chronological relationship between consecutive frames.

A series of encoded video data in accordance with MPEG video standards, as described above, is called an MPEG video bitstream (hereinafter simply referred to as "video stream"). Likewise, a series of encoded audio data in accordance with MPEG audio standards is called an MPEG audio bitstream (hereinafter simply referred to as "audio stream"). The video stream and audio stream are multiplexed in interleave fashion in accordance with the MPEG system standards as a series of data or MPEG system stream (sometimes referred to as a multiplex stream). The MPEG-1 is mainly associated with a storage medium such as a CD-ROM (Compact Disc-Read Only Memory), and the MPEG-2 incorporates many of the MPEG-1 standards and is used in a wide range of applications.

The following describes the flow from the encoding process. The MPEG encoding system first separately encodes video data and audio data to produce a video and audio stream. Next, a multiplexer (MUX) incorporated in the MPEG encoding system multiplexes the video stream and audio stream in a way that matches the format of a transfer medium or a recording medium, thus producing a system stream. The system stream is either transferred from the MUX via the transfer medium or is recorded on the recording medium.

A demultiplexer (DMUX) incorporated in the MPEG decoding system separates the system stream into a video stream and an audio stream. The decoding system separately decodes the individual streams to produce a decoded video output (hereinafter called "video output") and a decoded audio output (hereinafter called "audio output"). The video output is sent to a display, and the audio output is sent to a D/A (Digital/Analog) converter and a loud speaker via a low-frequency amplifier.

A system stream consists of a plurality of packs each having a plurality of packets. Each packet includes a plurality of access units, which are the units for the decoded reproduction. Each access unit corresponds to a single picture for a video stream, and corresponds to a single audio frame for an audio stream.

The encoding system affixes a pack header to the head of a pack and a packet header to the head of a packet. The pack header includes reference information, such as a reference time for synchronous reproduction called an SCR (System Clock Reference). Here, "reproduction" means the output of video and audio to an external unit.

The packet header includes information that allows identification of whether identifying subsequence data is video data, audio data or time stamp (TS) information. This TS information is used by the decoder to manage time during the decoding process. The packet length depends on the transfer medium and an application. For example, there is a short packet length of 53 bytes as in an ATM (Asynchronous Transfer Mode) and a long packet length of 4096 bytes for a CD-ROM. The upper limit of the packet length is set to 64 k bytes.

For instance, data is recorded on a CD-ROM continuously in units called sectors. Data is read from the CD-ROM by a CD-ROM player at a constant speed of 75 sectors per second. Each sector on a CD-ROM corresponds to one pack, which is the same as a packet in this case. When the head of an access unit is present in a packet, the encoding system affixes a TS to the packet header corresponding to that access unit. When the head of an access unit does not exist in a packet, the encoding system does not affix a TS. When the heads of two or more access units are present in a packet, the system encoder affixes a TS to the packet header corresponding to the first access unit.

There are two types of TS's: PTS (Presentation Time Stap) and DTS (Decoding Time Stap). The decoding standards are specified by a virtual reference decoder called an STD (System Target Decoder) in the MPEG system part. The reference clock for the STD is a sync signal called an STC (System Time Clock).

PTS information is used to manage reproduction output timing, and has a precision based on its 32 bit length and the timing of a 90-kHz clock. When the value of the PTS matches that of the STC, the audio/video decoding system decodes the access unit affixed to the PTS and produces output reproduction of sector data.

Since the inter-frame coding scheme is used for video, an I picture and a P picture are sent out in a video stream before a B picture. When receiving the video stream, therefore, the audio/video decoding system rearranges the pictures in an order based on the picture header affixed to each picture in that video stream, thus yielding a video output. The DTS is information for managing the decoding start time after the rearrangement of pictures. The encoding system affixes both the PTS and DTS to the packet header when both stamps differ from each other. The encoding system affixes only the PTS to the packet header when both stamps match. For example, in a video stream containing a B picture, a packet containing an I picture and a P picture would be affixed with both the PTS and DTS while a packet containing a B picture would be affixed with only the PTS. For a video stream having no B pictures, only the PTS would be affixed to the packet header.

The SCR is information for setting or correcting the value of the STC to a value intended by the encoding system. The precision of the SCR is expressed by a 32-bit value measured with a 90-kHz clock according to MPEG-1 standards and is expressed by a 42-bit value measured with a 27-kHz clock according to MPEG-2 standards. The SCR is transferred in 5 byte segments under MPEG-1 standards and in 6 byte segments under MPEG-2 standards. When the last byte is encoded, the decoding system sets the STC in accordance with the value of the SCR.

FIG. 13A shows one example of a system stream. One pack consists of a pack header H and individual packets V1, V2, A1, . . . , V6 and V7. The packets include the individual packets V1 to V7 of video data and the individual packets A1 to A3 of audio data. While each of the video and audio data packets are arranged in numerically increasing order, the sequential placement of individual audio and video data packets varies in the packet. For example, the audio data packet A1 follows the video data packets V1 and V2, the video data packet V3 follows this packet A1, and then the audio data packets A2 and A3 follow the packet V3. In this case, an SCR is affixed to the pack header H, the PTS(V1) is affixed to the packet header of the packet V1, the PTS(A1) is affixed to the packet header of the packet A1, and the PTS(V6) is affixed to the packet header of the packet V6. Therefore, the packets V1 to V5 constitute an access unit α as shown in FIG. 13B, the packets A1 to A3 constitute an access unit β as shown in FIG. 13C, and the packets V6 and V7 constitute an access unit γ as shown in FIG. 13D. In this case, the access units α and γ each correspond to a single picture, and the access unit β corresponds to a single audio frame. The DTS is not shown in FIGS. 13A through 13D.

FIG. 14 shows a block circuit of a conventional audio/video decoding system 111.

The audio/video decoding system 111 comprises an MPEG audio decoder 112, an MPEG video decoder 113 and an audio video parser (AV parser) 114. The AV parser 114 includes a demultiplexer (DMUX) 115.

The AV parser 114 receives a system stream sent from an external unit (e.g., a reader for a recording medium such as a video CD). The DMUX 115 separates the system stream to a video stream and an audio stream based on the packet header in the system stream. More specifically, the system stream shown in FIG. 13A is separated into a video stream consisting of the video data packets V1 to V7 and an audio stream consisting of the audio data packets A1 to A3.

The AV parser 114 extracts the SCR, the PTS for audio (hereinafter called "PTS(A)") and the PTS for video (hereinafter called "PTS(V)") from the system stream. The AV parser 114 outputs the audio stream, the SCR and the PTS(A) to the audio decoder 112, and outputs the video stream, the SCR and the PTS(V) to the video decoder 113.

The audio decoder 112 decodes the audio stream in accordance with the MPEG audio portion in order to produce an audio output. The video decoder 113 decodes the video stream in accordance with the MPEG video portion in order to produce a video output. The video output is sent to a display 116, while the audio output is sent to a loudspeaker 118 via an audio player 117, which has a D/A converter and a low-frequency amplifier.

The audio decoder 112 and the video decoder 113 perform synchronous reproduction of the audio output and the video output based on the associated SCRs and the PTS's. That is, the audio decoder 112 times the audio reproduction to produce audio output based on the SCR, PTS(A) and PTS (A1). The audio decoder then starts reproducing the access unit γ at time t3 as shown in FIG. 13D. The video decoder 113 times the video reproduction to produce video output based on the SCR and PTS(V), PTS(V1) and PTS(V6). The video decoder then reproduces access units α and β at the respective times t1 and t2 as shown in FIGS. 13B and 13C.

Reproduction timing of audio output by the audio decoder 112 and video output by the video decoder 113 are determined separately according to the respective time stamps PTS(A) and PTS(V).

In the synchronous reproduction of an audio output and a video output, "lip sync" should be considered. "Lip sync" refers to the synchronization of movement between the mouth of a person appearing on the display and accompanying audio. When the sound of the voice appears faster or slower than the movement of the mouth, a lip sync error occurs. Such an error, however, is not significant if it is below the frequency perceptible to the human ear. If the is sync error is above the limit of the human audio sensitivity, a listener/viewer will notice the discrepancy. Generally, the sensible limit of the lip sync error is said to be about several milliseconds.

The audio/video decoding system 111 shown in FIG. 14 cannot reliably prevent lip sync error because the decoding time of the STD (reference decoder) or the internal delay time in the STD is assumed to be zero. The actual decoding times of the audio decoder 112 and the video decoder 113 however are not zero, although they are very short. The decoding times (i.e., internal delay times) of the decoders 112 and 113 differ from each other, and also differ depending on the amount of data in an access unit to be processed. For instance, the number of packets forming each of the access units α to γ shown in FIGS. 13B to 13D will normally differ among various access units. Because individual packets do not always share the same packet length, the amounts of data in the access units α to γ will normally differ.

As a solution to the above shortcomings, a method has been proposed which synchronizes the video output with the audio output by delaying either the video or audio output based on the computed difference between the time stamps PTS(V) and PTS(A). This method requires a delay memory for delaying the video output or the audio output, thus increasing circuit scale and cost. Moreover, delay memory control presents considerable difficulties. Unfortunately, if the AV parser 114 assumes control over that function, the software demands on the AV parser 114 increase to such an extent as to affect the proper operation of the AV parser 114.

SUMMARY OF THE INVENTION

Accordingly, it is a primary objective of the present invention to provide an audio/video decoding system capable of ensuring improved synchronization between audio and video output.

It is a second objective of the present invention to provide an audio decoder capable of accurately obtaining the reproduction timing for an audio output.

It is a third objective of the present invention to provide a video decoder capable of accurately obtaining the reproduction timing for a video output.

To achieve the foregoing and other objects and in accordance with the purpose of the present invention, an improved audio/video decoding system is proposed that receives a system stream from which the decoding system produces decoded audio and video data. The system stream includes a multiplexed audio and video stream, coded in compliance with the Moving Picture Experts Group (MPEG) standards. The audio stream is defined as a series of encoded audio data, video stream is defined as a series of encoded video data. The system stream includes a system clock reference (SCR) to synchronize the audio and video outputs an audio time stamp to control the timing necessary to decode the audio stream and a video time stamp to control the timing necessary to decode the video stream.

The audio/video decoding system has an extractor responsive to the system stream that extracts the SCR, the audio time stamp and the video time stamp. A demultiplexer in the extractor divides the system stream into an audio stream and a video stream. The extractor then outputs the audio and video streams.

The audio/video decoding system utilizes an audio decoder and a video decoder. The audio decoder includes an audio stream processor which receives an audio stream and decodes it in compliance with the MPEG standards to produce an audio output. The audio decoder also includes an audio controller. The audio controller first computes an audio decoding time based on a delay time inherent to the audio stream processor during decoding operations, and second, computes the timing for audio output based on the computed audio decoding time, the SCR and the audio time stamp. The audio controller controls the output of audio from the audio processing circuit in accordance with the computed output timing.

The video decoder includes a video stream processor which receives a video stream and decodes it in compliance with the MPEG standards to produce a video output. The video decoder includes a video controller, which first, computes a video decoding time based on an internal delay time of the video stream processor in a decoding operation, and second, computes the timing for a video output based on the computed video decoding time, the SCR and the video time stamp. The video controller controls the output of video from the video stream processor in accordance with the timing of the video output.

Since the audio controller and the video controller compute the timing of the audio and video output with reference to the internal delay times of the audio stream processor and video stream processor during decoding operations, improved synchronization occurs between the audio and video output.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 5A is an explanatory diagram illustrating the various components in a video stream;

FIG. 5B is an explanatory diagram illustrating a video stream from which a PTS is removed;

DETAILED DESCRIPTION OF THE PREFERRED EMBODIMENTS

First Embodiment

Figure 1:
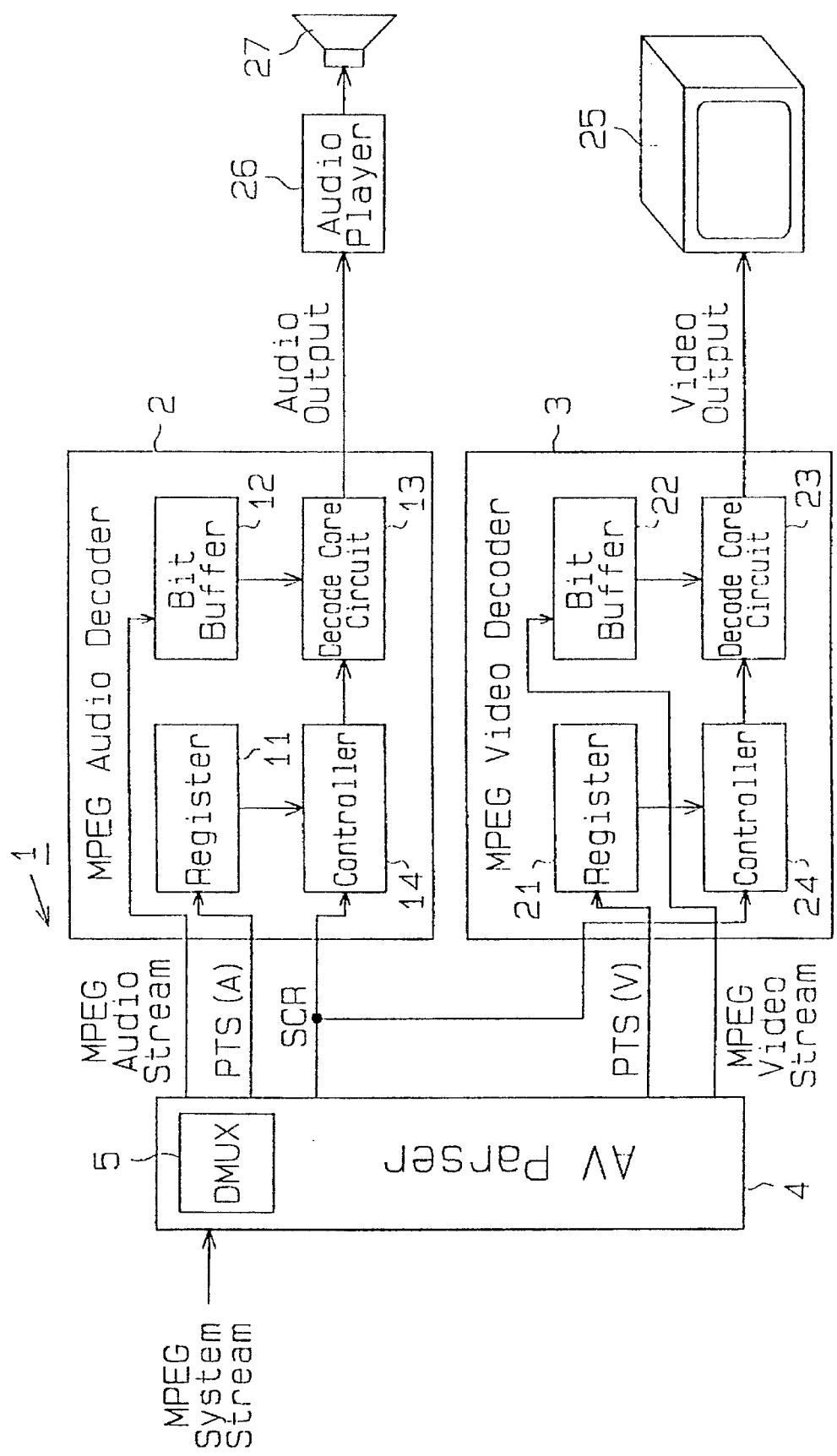
FIG. 1 is a block diagram illustrating an audio/video decoding system according to a first embodiment of the present invention.

An audio/video decoding system according to one embodiment of the present invention will be described with reference to the accompanying drawings. FIG. 1 shows the block circuit of the MPEG audio/video decoding system according to this embodiment.

An audio/video decoding system 1 has an MPEG audio decoder 2, an MPEG video decoder 3 and an audio video parser (AV parser) 4.

The AV parser 4 has a demultiplexer (DMUX) 5 which receives an MPEG system stream transferred from an external unit (e.g., a reader for a recording medium such as a video CD or a DVD (Digital Video Disc)). The DMUX 5 separates the system stream to a video stream and an audio stream based on the packet header in the system stream. The AV parser 4 extracts an SCR, a PTS for audio (hereinafter called "PTS(A)") and a PTS for video (hereinafter called "PTS(V)") from the system stream. The audio stream, the SCR and the PTS(A) are sent to the audio decoder 2, while the video stream, the SCR and the PTS(V) are sent to the video decoder 3.

The audio decoder 2 has a register 11, a bit buffer 12, a decode core circuit 13 and a controller 14. The register 11 utilizes FIFO (First-In-First-Out) organization and sequentially registers the PTS(A). The bit buffer 12 utilizes Random Access Memory (RAM) with an FIFO structure to sequentially store the audio data stream. The decode core circuit 13 decodes the audio stream, supplied from the bit buffer 12, in compliance with the MPEG audio part to thereby produce an audio output. The controller 14 computes the timing for audio reproduction output based on the audio decoder 2 timing or the internal delay time of the audio decoder 2, the SCR and the PTS(A). Using these timing inputs, the controller 14 controls the decode core circuit 13.

The video decoder 3 has a register 21, a bit buffer 22, a decode core circuit 23 and a controller 24. The register 21, organized with a FIFO structure, sequentially registers the PTS(V). A FIFO based bit buffer 22 sequentially stores a video stream and provides the stream to the decode core circuit 23 where the stream is first decoded in compliance with the MPEG video standards. This stream is then output as continuous video data. The controller 24 next computes the timing for reproducing video output based on the timing supplied by the video decoder or the internal delay time of the video decoder 3, the SCR and the PTS(V). Using these timing inputs, the controller 24 controls the decode core circuit 23.

Video output is then sent to a display 25, while audio output is sent to a loudspeaker 27 by means of an audio player 26 utilizing a D/A converter (not shown) and a low-frequency amplifier (not shown).

Figure 13A:
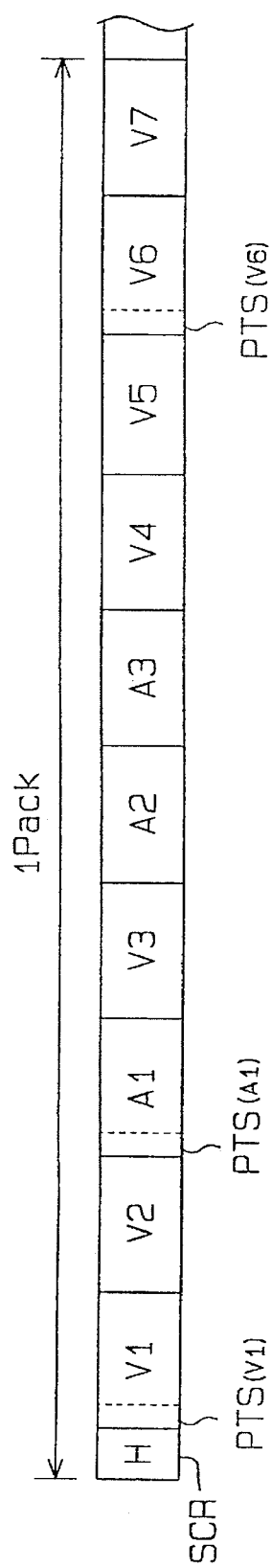
FIG. 13A is an explanatory diagram illustrating components of a system stream.

Upon reception of an externally transferred system stream having the structure as shown in FIG. 13A, the AV parser 4 separates the system stream into a video stream consisting of packets V1 to V7 of video data and an audio stream consisting of packets A1 to A3 of audio data.

Figure 13B:
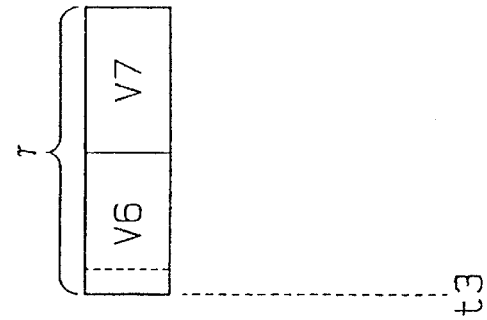
FIGS. 13B, 13C and 13D are explanatory diagrams illustrating access units.

The audio decoder 2 then sets the reproduction time for audio output based on the internal delay time of the audio decoder 2, the SCR, PTS(A) and PTS(A1). The decoder 2 then starts the reproduction of an access unit γ at time t3 as shown in FIG. 13B. This will be explained in detail below. The controller 14 reads the PTS(A1) from the register 11 and an audio stream from the bit buffer 12, and then sends both to the decode core circuit 13. The controller 14 next computes the reproduction time for an audio output based on the internal delay time of the audio decoder 2, the SCR and PTS(A1). The decode core circuit 13 decodes the individual packets A1–A3 of the audio stream in compliance with the MPEG audio standards to produce audio output. The controller 14 controls the decode core circuit 13 in such a manner that audio output is reproduced at the computed reproduction time.

The internal delay time of the audio decoder 2 is the sum of the time required to read an audio stream from the bit buffer 12 (the internal delay time of the bit buffer 12) and the decoding time of the decode core circuit 13 (the internal delay time of the decode core circuit 13). The internal delay time of the bit buffer 12 changes in accordance with the size of the audio stream in the bit buffer 12. The larger the audio stream, the greater the internal delay. The internal delay time of the decode core circuit 13 is constant. The time required to read the PTS(A) from the register 11 is so much smaller than the internal delay time of the bit buffer 12, that even when PTS(A) is added to the signal processing time of the controller 14, the time required to read the PTS(A) is negligible.

The internal delay time in the bit buffer 12 is previously determined by way of experiments in production design. A ROM (not shown) in the controller 14 stores a data table indicative of the relationship between the internal delay time and size of the audio stream, obtained from the experiments. Upon the computation of audio output reproduction time, the controller 14 looks up the data table to know an internal delay time in the audio decoder 2.

Figure 13C:
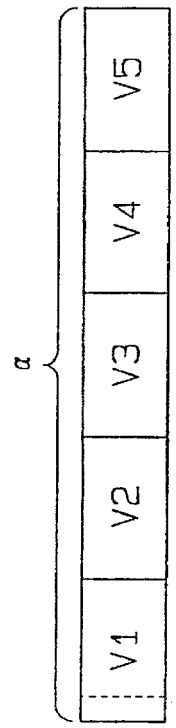
Figure 13D:
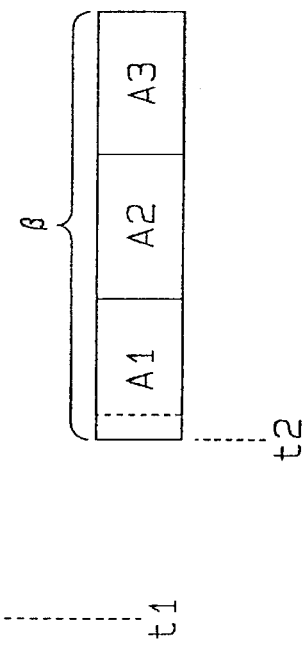
Figure 14:
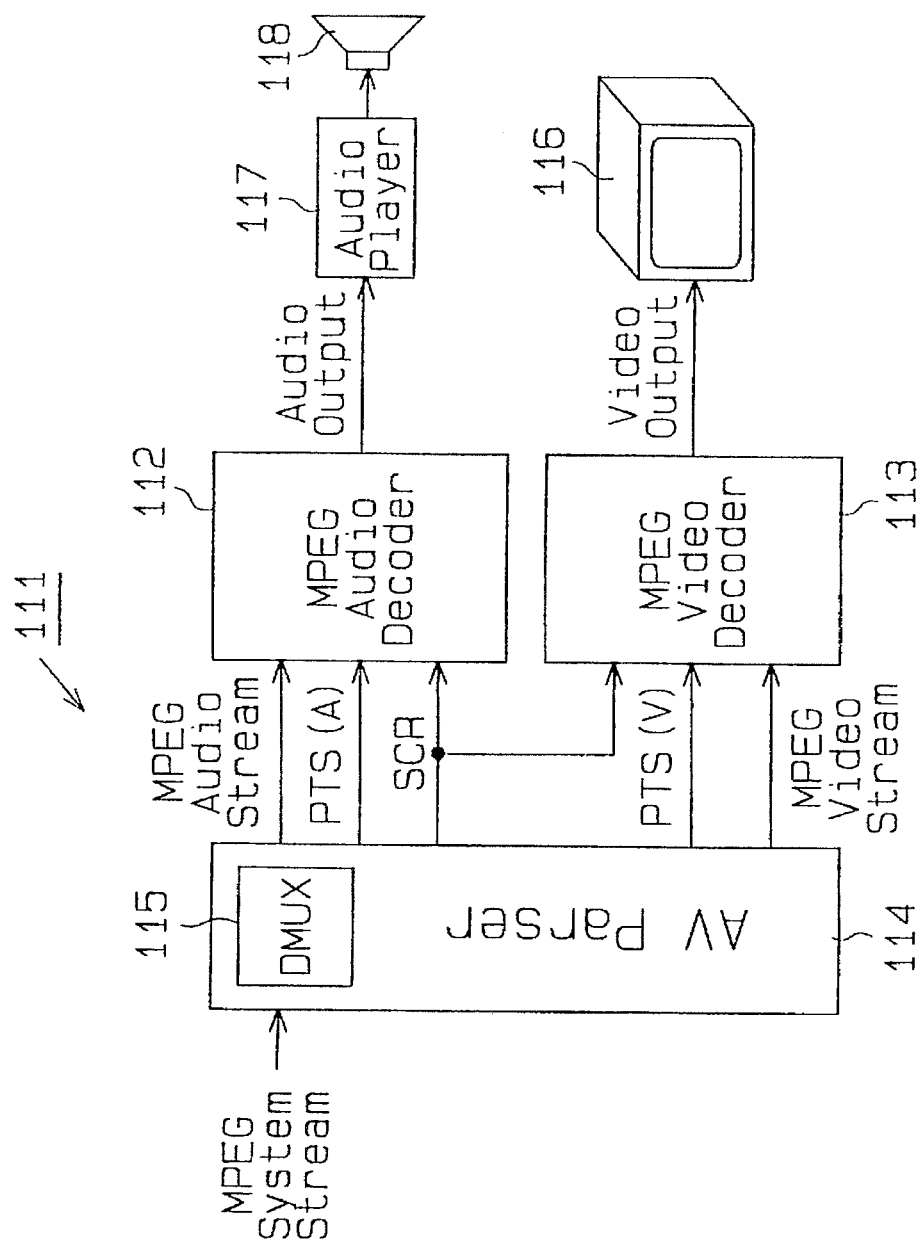
FIG. 14 is a block diagram illustrating a conventional audio/video decoding system.

The video decoder 3 sets the reproduction timing of the video output based on the internal delay time of the video decoder 3, the SCR and the PTS(V) (PTS(V1), PTS(V6)), and starts the reproduction of access units α and β at times t1 and t2 as shown in FIGS. 13B and 13C. This will be explained below more specifically. The controller 24 reads the PTS(V1) and PTS(V6) from the register 21, reads a video stream from the bit buffer 22 and sends them to the decode core circuit 23. The controller 24 computes the reproduction timing of the video output based on the internal delay time of the video decoder 3, the SCR, the PTS(A1) and the PTS(V6). The decode core circuit 23 decodes the individual packets V1–V7 of the video stream in compliance with the MPEG video standard to produce a video output. The controller 24 controls the decode core circuit 23 in such a manner that the video output is reproduced at the computed reproduction time.

The internal delay time of the video decoder 3 is the sum of the time required to read a video stream from the bit buffer 22 (the internal delay time of the bit buffer 22) together with the operational time required by the decode core circuit 23 (i.e., the internal delay time of the decode core circuit 23). The internal delay time of the bit buffer 22 changes in accordance with the amount of the video stream occupying the bit buffer 22. The larger the video data, the larger the internal delay time becomes. The internal delay time of the decode core circuit 23 is constant. The controller 24 controls the register 21 in such a way that the time required to read the PTS(V) matches the internal delay time of the bit buffer 22.

A ROM (not shown) in the controller 24 stores a data table indicative of the relationship between the size of the video stream and the internal delay time in the bit buffer 22 determined by way of experiments in production design. Upon the computation of video output reproduction time, the controller 24 looks up the data table to know an internal delay time in the video decoder 3.

The respective timings of the audio output from the audio decoder 2 and the video output from the video decoder 3 are executed separately in accordance with the respective PTS (A) and PTS(V).

According to this embodiment, as described above, the reproduction timing of the audio and video outputs are determined using the internal delay times of the individual decoders 2 and 3 as well as the SCR and PTS. This scheme can ensure sufficient synchronization (lip sync) of the audio output with the video output. This eliminates the need for an additional delay memory for either the video or audio component. This also allows for a reduction in the size of the circuit scale and in circuit construction costs.

Second Embodiment

A second embodiment of the present invention will be described below with reference to FIGS. 2 through 5. Like or same reference symbols used for the components of the first embodiment are also used to denote corresponding or identical components of the second embodiment in order to avoid duplicating their description.

Figure 2:
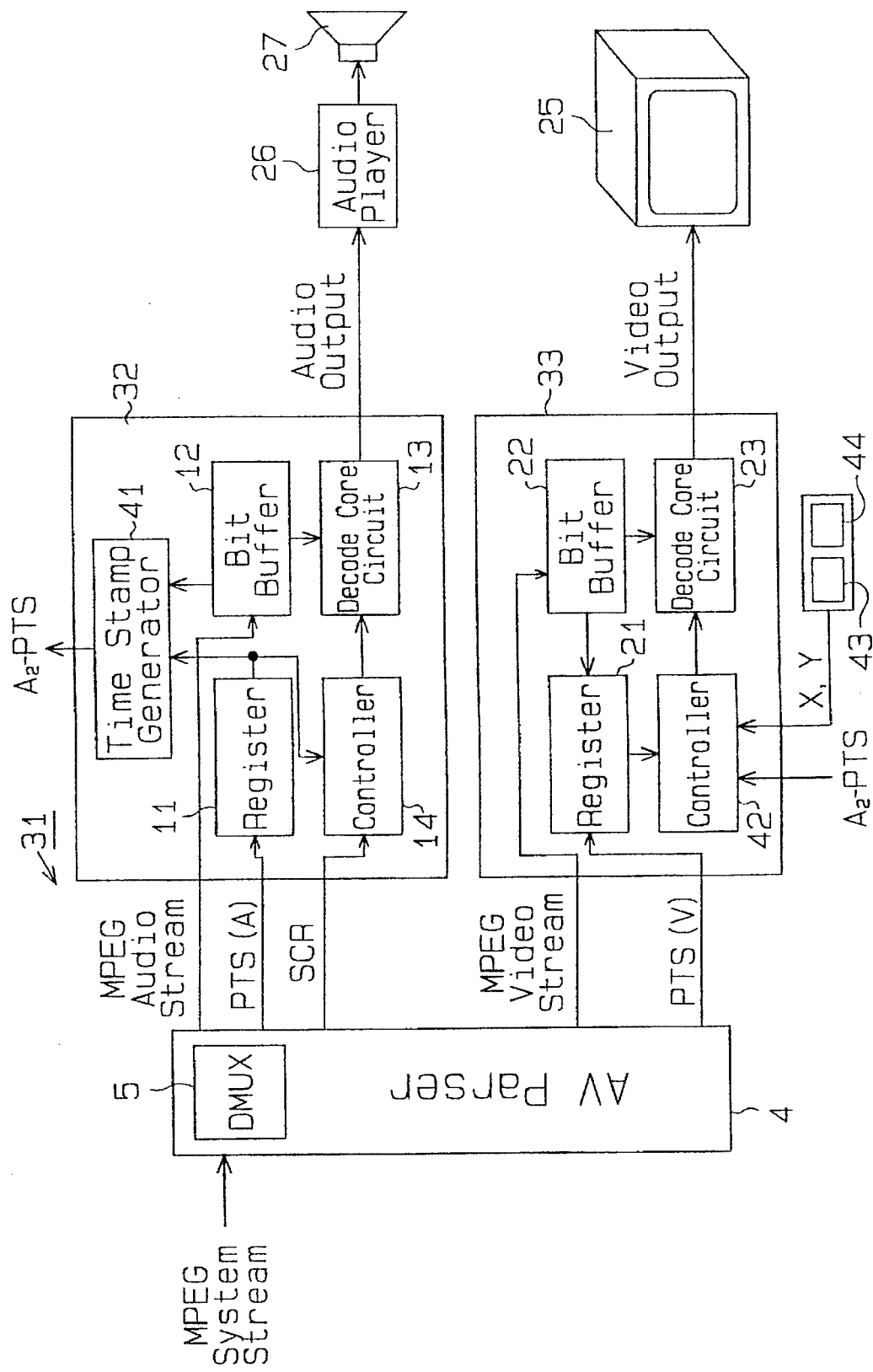
FIG. 2 is a block diagram illustrating an audio/video decoding system according to a second embodiment of this invention.

FIG. 2 shows the block circuit of an MPEG audio/video decoding system 31 according to this embodiment. The audio/video decoding system 31 comprises an MPEG audio decoder 32, an MPEG video decoder 33 and an AV parser 4. The AV parser 4 has a demultiplexer (DMUX) 5.

The AV parser 4 separates the audio and video streams, outputs the audio stream, SCR and PTS(A) to the audio decoder 32, and outputs the video stream and PTS(V) to the video decoder 33. In this embodiment unlike in the first embodiment, the AV parser 4 does not provide the SCR to the video decoder 33.

The audio decoder 32 comprises a register 11, a bit buffer 12, a decode core circuit 13, a controller 14 and a time stamp generator 41. The time stamp generator 41 generates a time stamp $A_2$-PTS (hereinafter referred simply as "$A_2$-PTS") as discussed later. The control 14 controls the time stamp generator 41 as well as the register 11, bit buffer 12 and decode core circuit 13. The controller 14 computes the reproduction timing for an audio output based on the SCR and PTS(A), without considering the internal delay time of the audio decoder 32.

The video decoder 33 comprises a register 21, a bit buffer 22, a decode core circuit 23 and a controller 42. The controller 42 computes the reproduction timing of the video output which the controller 42 uses to control the decode core circuit 23. Reproduction timing is computed based on the $A_2$-PTS generated from the time stamp generator 41, the decoding time of the video decoder 33 or the internal delay time of the video decoder 33 (hereinafter called "video decode delay time") D(t), and the PTS(V). The video decode delay time D(t) is the sum of the internal delay time VD of the bit buffer 22 and the internal delay time $\Delta V$ of the decode core circuit 23.

Figure 3:
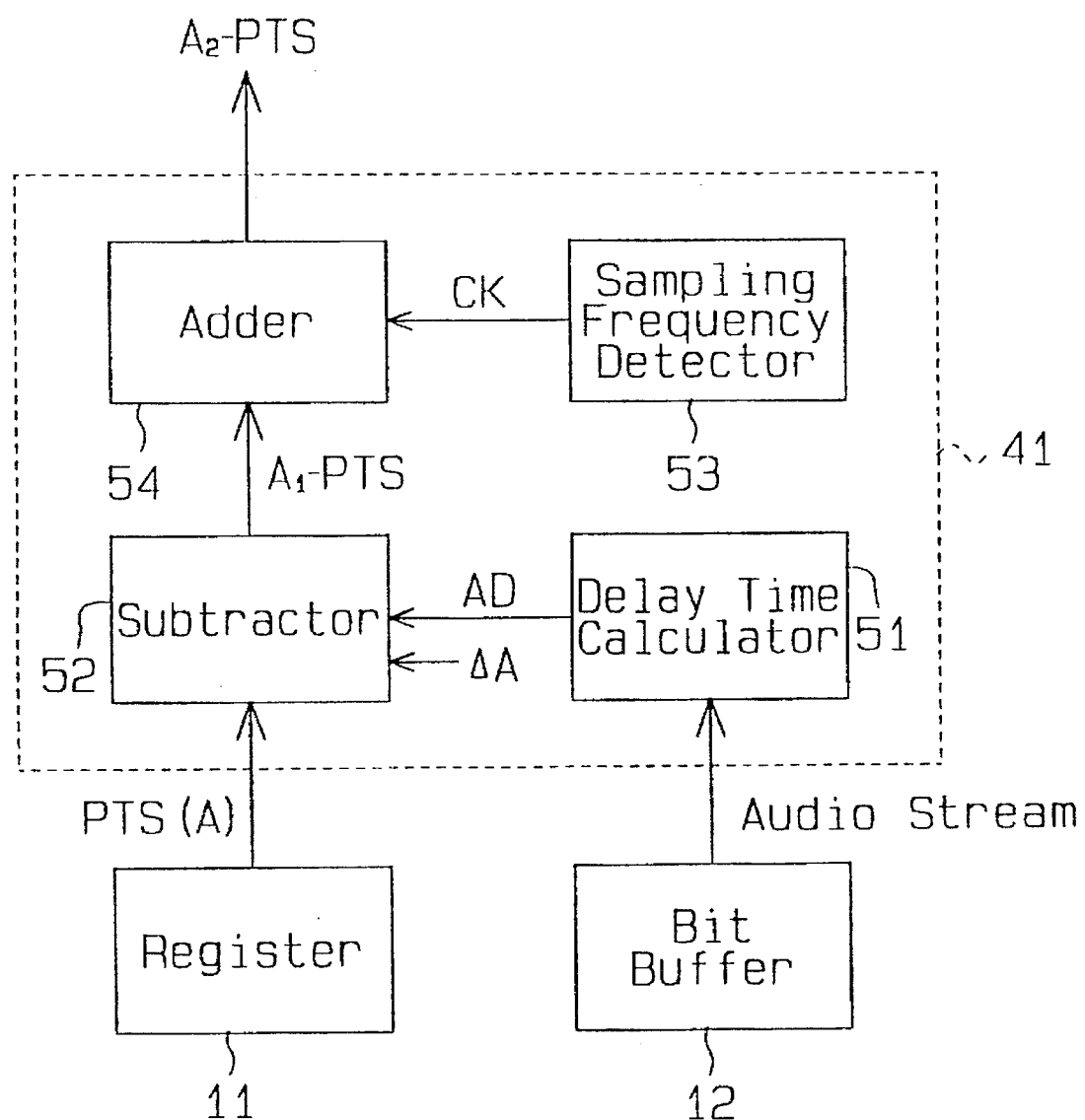
FIG. 3 is a block diagram illustrating a time stamp generator in an audio decoder in FIG. 2.

FIG. 3 shows the block circuit of the time stamp generator 41.

The time stamp generator 41 comprises a delay time calculator 51, a subtracter 52, a sampling frequency detector 53 and an adder 54. The delay time calculator 51 calculates the internal delay time AD of the bit buffer 12. The internal delay time AD varies in accordance with the size of the video stream occupying the bit buffer 12. The larger the occupying amount is, the greater the internal delay time AD becomes. The subtracter 52 subtracts the sum of the internal delay time AD and the internal delay time $\Delta A$ of the decode core circuit 13 from the PTS(A) read from the register 11 to produce time stamp $A_1$-PTS. That is, $A_1$-PTS is produced according to the following equation.

$$A_1\text{-}PTS = PTS(A) - AD - \Delta A$$

The time stamp $A_1$-PTS thus reflects the influence of the individual internal delay times AD and $\Delta A$ on PTS(A). The internal delay time $\Delta A$ is constant.

The sampling frequency detector 53 detects the sampling frequency of audio data from the audio stream and produces a clock signal CK corresponding to that sampling frequency. This sampling frequency is defined to be 44.1 kHz by the CD (Compact Disc) standards. The adder 54 adds $A_1$-PTS and clock CK to produce $A_2$-PTS. The reason for the addition of the clock CK to $A_1$-PTS is to produce $A_2$-PTS in real time. When the head of an audio frame (or access unit) is located in a packet, PTS(A) is affixed to the packet header of that packet as mentioned earlier. If the head of an audio frame is not present in a packet, no PTS(A) is affixed to that packet. When the heads of two or more audio frames exist in a packet, only the PTS(A) corresponding to the first audio frame is affixed to the packet header of that packet. Even when the head of an audio frame is in a specific packet, the time stamp PTS(A) will not always be affixed to that specific packet's header. Accordingly, PTS(A) will only be intermittently read from the register 11. When no PTS(A) is read from the register, therefore, the time stamp generator 41 produces $A_1$-PTS from the previously read PTS(A) and adds the value of clock CK to $A_1$-PTS to produce the $A_2$-PTS. Accordingly, the time stamp generator 41 generates the $A_2$-PTS in real time. Every time a new PTS(A) is read from the register 11, $A_2$-PTS is produced regardless of the previously generated $A_2$-PTS.

In the above-described manner, the time stamp generator 41 produces the time stamp value $A_2$-PTS based on the internal delay time (AD+$\Delta A$) of the audio decoder 32 and the clock CK in a way that corresponds to the sampling frequency of the audio data. $A_2$-PTS therefore reflects the influence of the individual internal delay times AD and $\Delta A$ and the clock CK on the time stamp PTS(A).

Figure 4:
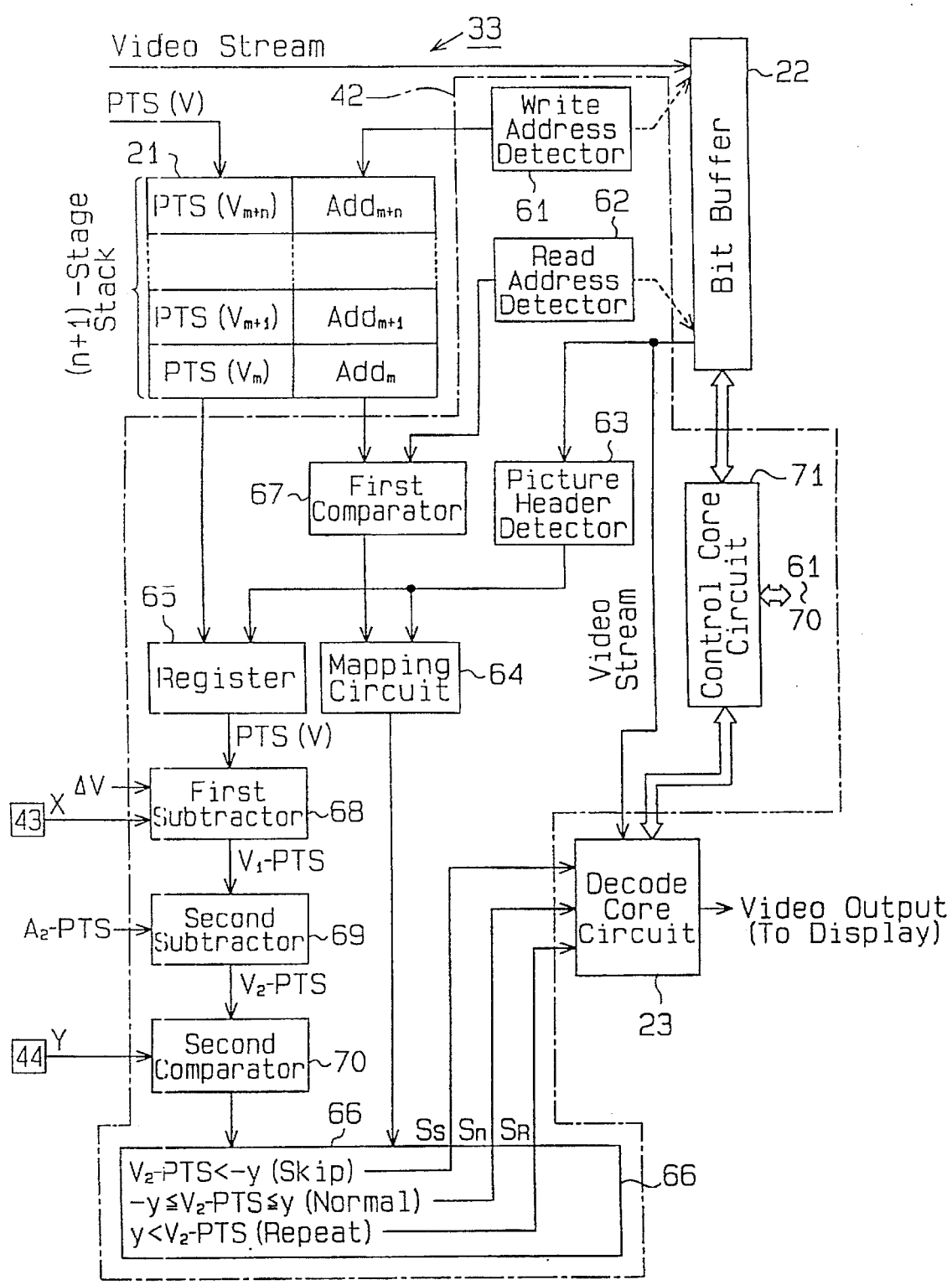
FIG. 4 is a block diagram illustrating a controller in a video decoder in FIG. 2.

FIG. 4 shows the block circuit of the video decoder 33. A controller 42 comprises a write address detector 61, a read address detector 62, a picture header detector 63, a mapping circuit 64, a register 65, a sync determining circuit 66, first and second comparators 67 and 70, first and second subtractor 68 and 69, and a control core circuit 71 which controls the individual circuits 61 to 70. The control core circuit 71 also controls the bit buffer 22 and the decode core circuit 23.

The write address detector 61 detects the address Add of a packet affixed with a PTS(V) when a video stream is accumulated in the bit buffer 22. This detection will be discussed in detail below. The AV parser 4 separates a PTS(V) from a video stream, the bit buffer 22 accumulates the video stream and the register 21 holds the PTS(V). At this time the write address detector 61 detects the address Add of the packet (or packet header) affixed with the PTS(V), considering that the video stream has been written in the bit buffer 22 with the PTS (V) unseparated. Consequently, the detected address Add corresponds to the address of the PTS(V). Since the amount of PTS(V) data is smaller than the amount of data in a packet, the packet address add can be associated with the address of the PTS(V) without changing the address of the packet stored in the bit buffer 22.

The control core circuit 71 sequentially accumulates the detected address Add in the register 21 with the time stamp PTS(V). The register 21 has a stack formed, for example, with (n+1) stages. Consequently, (n+1) stages of PTS($V_m$) to PTS($V_{m+n}$), sequentially extracted from a video stream, are stored one by one in the register 21 together with the associated addresses $Add_m$ to $Add_{m+n}$ as sets. The read address detector 62 detects the address of the video stream, read from the bit buffer 22. The picture header detector 63 detects the picture header which is affixed to the head of each picture of the video stream written in the bit buffer 22, and detects the picture type (I, P, B) specified by each picture header. The control core circuit 71 reads one picture of the video stream from the bit buffer 22 every given period in accordance with the detection result.

The first comparator 67 first compares the address of the video stream read from the bit buffer 22 with the address Add($Add_m$) associated with the PTS(V) and PTS($V_m$) read from the register 11. The comparator 67 then determines if both addresses match. The mapping circuit 64 maps the PTS(V) and a picture in accordance with the result of the determination by the first comparator 67 and the result of the detection by the picture header detector 63.

The operations of the individual circuits 62–64 and 67 will now be described with reference to the video streams exemplified in FIGS. 5A and 5B. As shown in FIG. 5A, the video stream consists of two packets P and Q with PTS($V_m$) and PTS($V_{m+1}$) respectively affixed to the packet headers of the packets P and Q. The packet P includes three B pictures B1, B2 and B3. The head of the B picture B1 is not located in the packet P. The packet Q includes the B picture B3, I picture I1 and P picture P1. The head of the B picture B3 is not located in the packet Q. That is, the PTS($V_m$) is the PTS(V) associated with the B pictures B2 and B3, while the PTS($V_{m+1}$) is the PTS(V) associated with the I picture I1 and P picture P1. The addresses $Add_m$ and $Add_{m+1}$ are associated with the pTS($V_m$) and PTS($V_{m+1}$). The time stamps PTS ($V_m$) and PTS($V_{m+1}$) together with individual addresses $Add_m$ and $Add_{m+1}$ are accumulated in the register 21. The video stream shown in FIG. 5A is stored in the bit buffer 22 with the PTS($V_m$) and PTS($V_{m+1}$) removed as shown in FIG. 5B.

When a video stream is read from the bit buffer 22, the read address detector 62 detects the address of the video stream and the first comparator 67 compares that address with the address $Add_m$ stored in the register 21. The picture header detector 63 detects the picture header affixed to the head of a picture in the video stream. When the first comparator 67 determines that both addresses coincide with each other, the mapping circuit 64 determines that the picture whose head is affixed with the detected picture (the B picture B2 in this case) is associated with the address $Add_m$ (i.e., PTS($V_m$)). More specifically, the mapping circuit 64 identifies the picture associated with the PTS($V_m$) as the B picture B2, rather than B picture B1. Similarly the circuit 64 identifies that the time stamp PTS($V_{m+1}$) is associated with I picture I1, rather than the B picture B3. This determining operation is called "mapping".

According to this embodiment, as apparent from the above, the individual circuits 62–64 and 67 perform operations equivalent to the operation of computing the internal delay time VD of the bit buffer 22. When a video stream is supplied to the decode core circuit 23 from the bit buffer 22, each picture address is associated with the address of PTS(V). This corresponds or defines the internal delay time VD. Consequently, the time stamp PTS(V) read from the register 21 reflects the influence of the internal delay time VD of the bit buffer 22 on the PTS(V) written in the register 21. The operations of the individual circuits 62–64 and 67 in the video decoder 33 all reflect the operation of the delay time calculator 51 in the audio decoder 32. The internal delay time VD varies in accordance with the size of the video stream occupying the bit buffer 22; the larger the stream is, the greater the internal delay time VD becomes.

The register 65 is formed with a one-stage stack and operates using the inter-frame coding technique. This operation substitutes the time stamp PTS(V) associated with an I or a P picture with the time stamp PTS(V) associated with a B picture. Picture types are detected by the picture header detector 63.

The first subtracter 68 subtracts the sum of the internal delay time ΔV of the decode core circuit 23 and the value set by an external input device 43 shown in FIG. 2 and FIG. 4 from the PTS(V) read from the register 65, to yield $V_1$-PTS. That is, the time stamp $V_1$-PTS is produced according to the following equation.

$$V_1\text{-}PTS = PTS(V) - \Delta V - x$$

The influence of the internal delay time VD is consequently reflected in the time stamp PTS(V) read from the register 65. Therefore, $V_1$-PTS reflects the influence of the video decode delay time D(t) (VD+ΔV) and x on PTS(V) when PTS(V) is written in the register 21. The internal delay time ΔV is constant. The value x is set by a user operating the input device 43.

The second subtracter 69 subtracts $V_1$-PTS from $A_2$-PTS generated by the time stamp generator 41, to yield $V_2$-PTS. That is, $V_2$-PTS is produced according to the following equation.

$$V_2\text{-}PTS = A_2\text{-}PTS - V_1\text{-}PTS = A_2\text{-}PTS - PTS(V) + \Delta V + x$$

Here, $A_2$-PTS is produced in real time. Regardless of when $V_1$-PTS is produced, $V_2$-PTS is also produced in real time.

The second comparator 70 compares a value y set by an external input device 44 shown in FIG. 2 and FIG. 4 with $V_2$-PTS. The value y is set by the user operating the input device 44 in such a way that y has a value greater than half the time it takes to produce one picture. When the mapping of the PTS(V) and a picture is processed by the mapping circuit 64, the sync determining circuit 66 produces individual control signals $S_S$, $S_n$ and $S_R$ from the output of the second comprator 70. The sync determining circuit 66 produces the control signal $S_S$ when $V_2$-PTS<−y. The sync determining circuit 66 produces the control signal $S_n$ when −y≦$V_2$-PTS≦y (i.e., |$V_2$-PTS|≦y) and produces the control signal $S_R$ when y<$V_2$-PTS.

When the value of y is sufficiently smaller than $A_2$-PTS and $V_1$-PTS, the sync determining circuit 66 produces the individual control signals $S_S$, $S_n$ and $S_R$ as follows. Control signal $S_S$ is produced when $A_2$-PTS<$V_1$-PTS. Control signal $S_n$ is produced when $A_2$-PTS=$V_1$-PTS, while control signal $S_R$ is produced when $A_2$-PTS>$V_1$-PTS. The individual control signals $S_S$, $S_n$ and $S_R$ are input to the decode core circuit 23 to control this circuit 23.

The decode core circuit 23 decodes the video stream read from the bit buffer 22 and produces a video output for each picture. When the control signal $S_S$ is produced, the decode core circuit 23 performs a skip operation. More specifically, when the control signal $S_S$ is produced, the decode core circuit 23 abandons the picture sent from the bit buffer 22 and does not decode the abandoned picture. When control signal $S_S$ generation stops, the decode core circuit 23 returns to the normal operation. As a result, the skip reproduction is performed that skips the specific video picture reproduced on the display 25 by several frames.

When the control signal $S_n$ is produced, the decode core circuit 23 performs normal operations and normal reproduction is carried out on the display 25. When the control signal $S_R$ is produced, the decode core circuit 23 performs a repeat operations. More specifically, while the control signal $S_R$ is produced, the decode core circuit 23 continues video output of the picture transferred from the bit buffer 22 before the generation of the control signal $S_R$. When the generation of the control signal $S_R$ is stopped, the decode core circuit 23 returns to the normal operation. As a result, the same video reproduction is continuously shown on the display 25.

In the case where the value y is sufficiently smaller than the $A_2$-PTS and $V_1$-PTS, the decode core circuit 23 executes the skipping operation when $A_2$-PTS<$V_1$-PTS, and executes the normal operation when $A_2$-PTS=$V_1$-PTS. When $A_2$-PTS>$V_1$-PTS, the decode core circuit 23 executes the repeat operation.

The reason value y can be designated by the input device 44 is that the $A_1$-PTS rarely ever fully coincides with the $V_1$-PTS. When $A_2$-PTS completely matches $V_1$-PTS ($A_2$-PTS=$V_1$-PTS), the decode core circuit 23 executes normal decoding operation. Should the value y be sufficiently smaller than the $A_2$-PTS and $V_1$-PTS, the decode core circuit 23 rarely performs normal decoding operations. Should the listener/viewer (or user) properly set the value y, the decode core circuit 23 performs the normal decoding operations when there is a sufficiently high degree of coincidence between $A_2$-PTS and $V_1$-PTS. In other words, the value y can be designated by the input device 44 to allow for virtual coincidence between time stamps $A_2$-PTS and $V_1$-PTS.

The value x can also be designated by the input device 43 so as to permit the decode core circuit 23 to perform the skip operation or the repeat operation as needed. As the listener/viewer adjusts the value x, the time stamp $V_1$-PTS varies. The decode core circuit 23 performs the individual operations in accordance with a change in $V_1$-PTS.

According to this embodiment, as described above, the controller 42 compensates the PTS(V) based on $A_2$-PTS, the video decode delay time D(t) (VD+ΔV) and the value x. Controller 42 then produces time stamp $V_2$-PTS. $A_2$-PTS is generated using the internal delay time (AD+ΔA) from the audio decoder 32. Based on the comparison between the $V_2$-PTS and the value y, the controller 42 produces one of the control signals $S_S$, $S_n$ and $S_R$ to control the operational mode of the decode core circuit 23 to skip, decode normally or to repeat.

The controller 42 therefore controls the decode core circuit 23 based not only on the internal delay time of the video decoder 33 but also on the internal delay time of the audio decoder 32. That is, the controller 42 sets the reproduction timing for video output taking into account the internal delay time of the audio decoder 32 as well as the video decoder 33. Reproduction timing for a video output is thus adjusted in accordance with the reproduction timing for an audio output. This scheme enhances synchronization of the audio and the video outputs even more than the first embodiment.

Should reproduction timing of the video output lag that of the audio output, the controller 42 allows the decode core circuit 23 to execute skipping operations so that the display 25 displays skipped video output. As a result, the video output in effect catches up with the audio output. On the other hand, when video output leads audio output, the controller 42 instructs the decode core circuit 23 to repeat decoding operations so that the display 25 displays repeated audio output. As a result, the video output in effect catches up with the audio output.

The reproduction timing for a video output is adjusted to match with the reproduction timing of an audio output for the following reason. While a person may not be able to detect a slight deviation or mistiming of a video or motion picture by several frames, a person usually can sense the deviation or mistiming of audio reproduction when output out of synchronization with the video.

The adjustment of the value y by the user, therefore, permits the precision of the synchronization of an audio output with a video output to be set as desired. If the value y increases, the difference between the $A_2$-PTS and $V_1$-PTS becomes greater and the precision of the synchronization of an audio output with a video output becomes lower. The reason to allow adjustable synchronization precision of audio and video output is that the PTS (i.e., PTS(A) and PTS(V)) may not be accurately affix depending on the particular format of the system streams. For example, some commercially available video CDs or DVD (Digital Video Disc) do not accurately affixed a PTS to the system stream. The value y is set greater than a half the time during which one picture is reproduced. Because, even when the value y is set below the half time, no lip sync error recognizable to humans will occur in spite of further improving the synchronization precision between audio and video output.

User adjustment of the value x allows for adjustment of the phase of an audio and video output. This is particularly well suited in cases where a system stream is read from a storage medium such as a CD-ROM. For example, this feature can be utilized to compensate for deviation in synchronization between the audio and video output when the user reproduces a moving picture faster than the normal reproduction speed. A moving picture may be reproduced faster than the normal reproduction speed when the user performs the fast forward (FF) reproduction to see the moving picture quickly or when the user either fast forwards or reverses through the video to search for a desired scene. In such a case, the audio output is also reproduced.

Third Embodiment

A third embodiment of the present invention will be described below with reference to FIGS. 6 through 9. Like or same reference symbols used for the components of the second embodiment are used to denote corresponding or identical components of the third embodiment.

Figure 6:
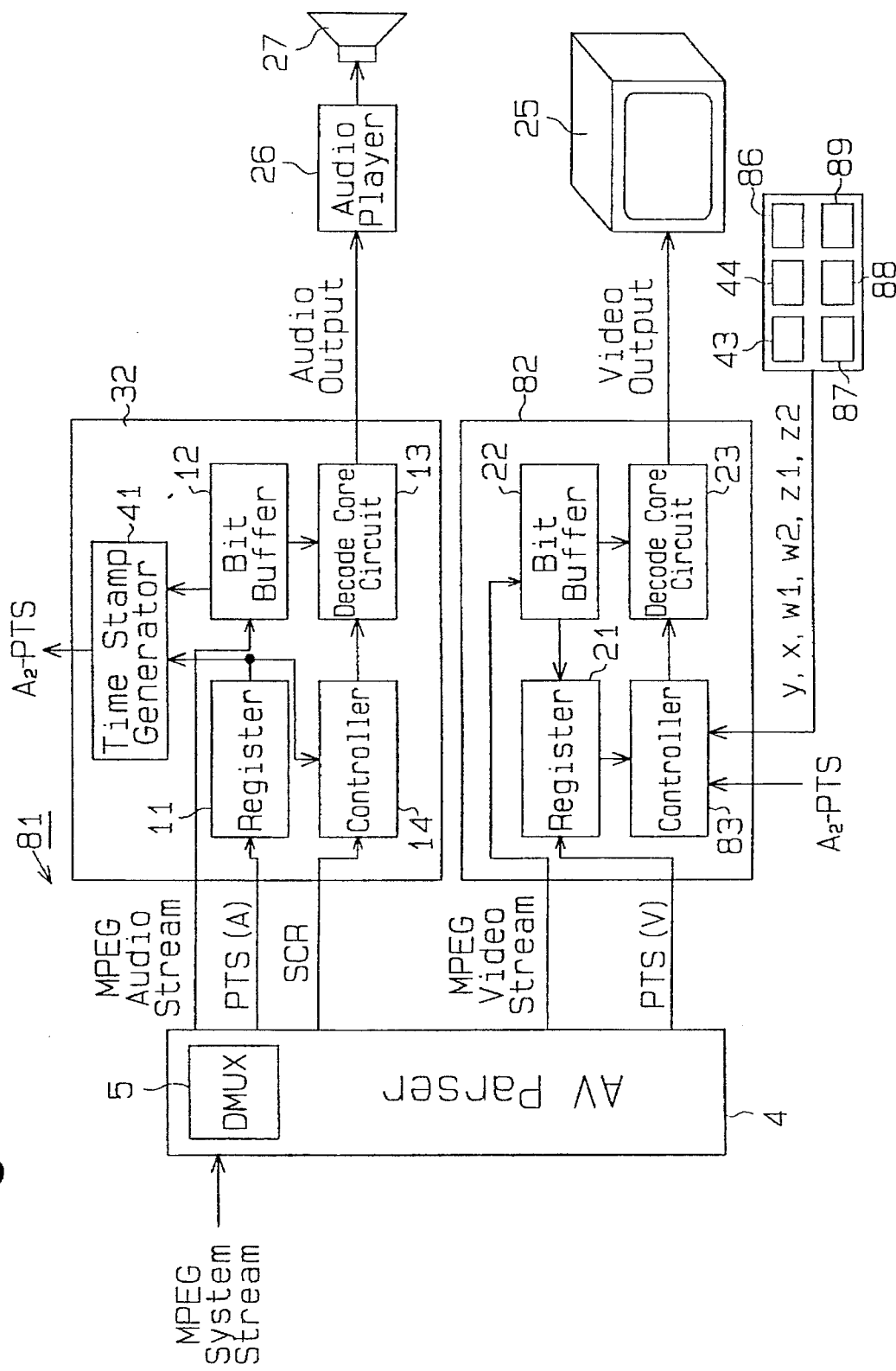
FIG. 6 is a block diagram illustrating an audio/video decoding system according to a third embodiment of this invention.

FIG. 6 shows the block circuit of an MPEG audio/video decoding system 81 according to this embodiment. The audio/video decoding system 81 comprises an audio decoder 32, an MPEG video decoder 82 and an AV parser 4. The AV parser 4 here includes a DMUX 5. The AV parser 4 outputs an audio stream, SCR and PTS(A) to the audio decoder 32, and a video stream and PTS(V) to the video decoder 82.

The video decoder 82 comprises a register 21, a bit buffer 22, a decode core circuit 23 and a controller 83. The controller 83 computes the reproduction timing of the video output based on $A_2$-PTS, the decoding time of the video decoder 82, and a PTS(V). Controller 83 further compensates either output $S_S$ or $S_R$ by comparator/counter circuits to generate control signals $S_{Sm}$ or $S_{Rm}$. In accordance with the compensation result, the controller 83 controls the decode core circuit 23. The internal delay time of the video decoder 82 is the same as the internal delay time of the video decoder 33 in the second embodiment, and will be called "video decode delay time" $D(t)$ hereinafter.

Figure 7:
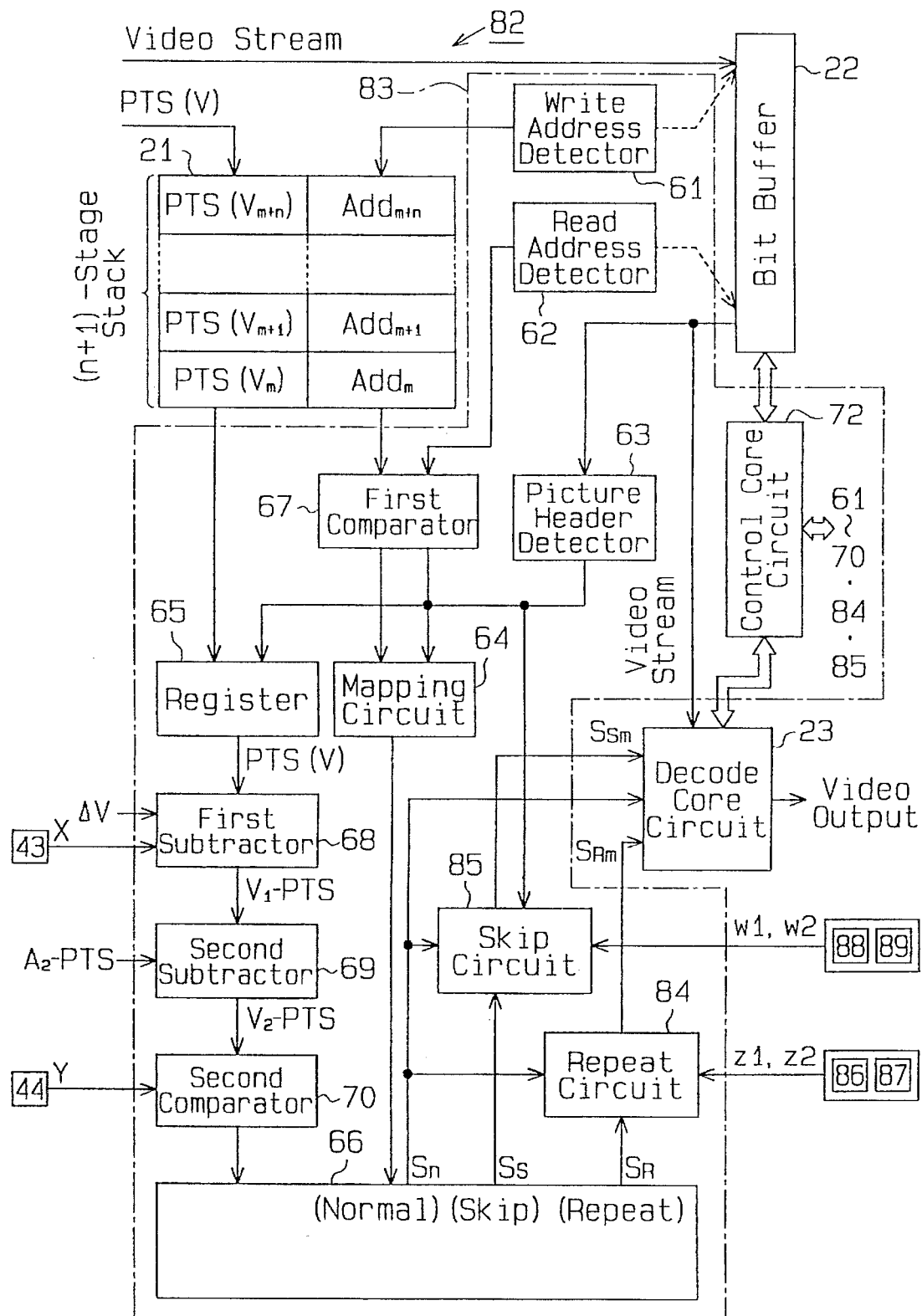
FIG. 7 is a block diagram illustrating a controller in a video decoder in FIG. 6.

FIG. 7 shows the block circuit of the video decoder 82. A controller 83 comprises a write address detector 61, a read address detector 62, a picture header detector 63, a mapping circuit 64, a register 65, a sync determining circuit 66, first and second comparators 67 and 70, first and second subtracters 68 and 69, a comparator/counter repeat circuit 84, a comparator/counter skip circuit 85, and a control core circuit 72 which controls the individual circuits 61 to 70, 84 and 85. The control core circuit 72 also controls the bit buffer 22 and the decode core circuit 23.

Figure 8:
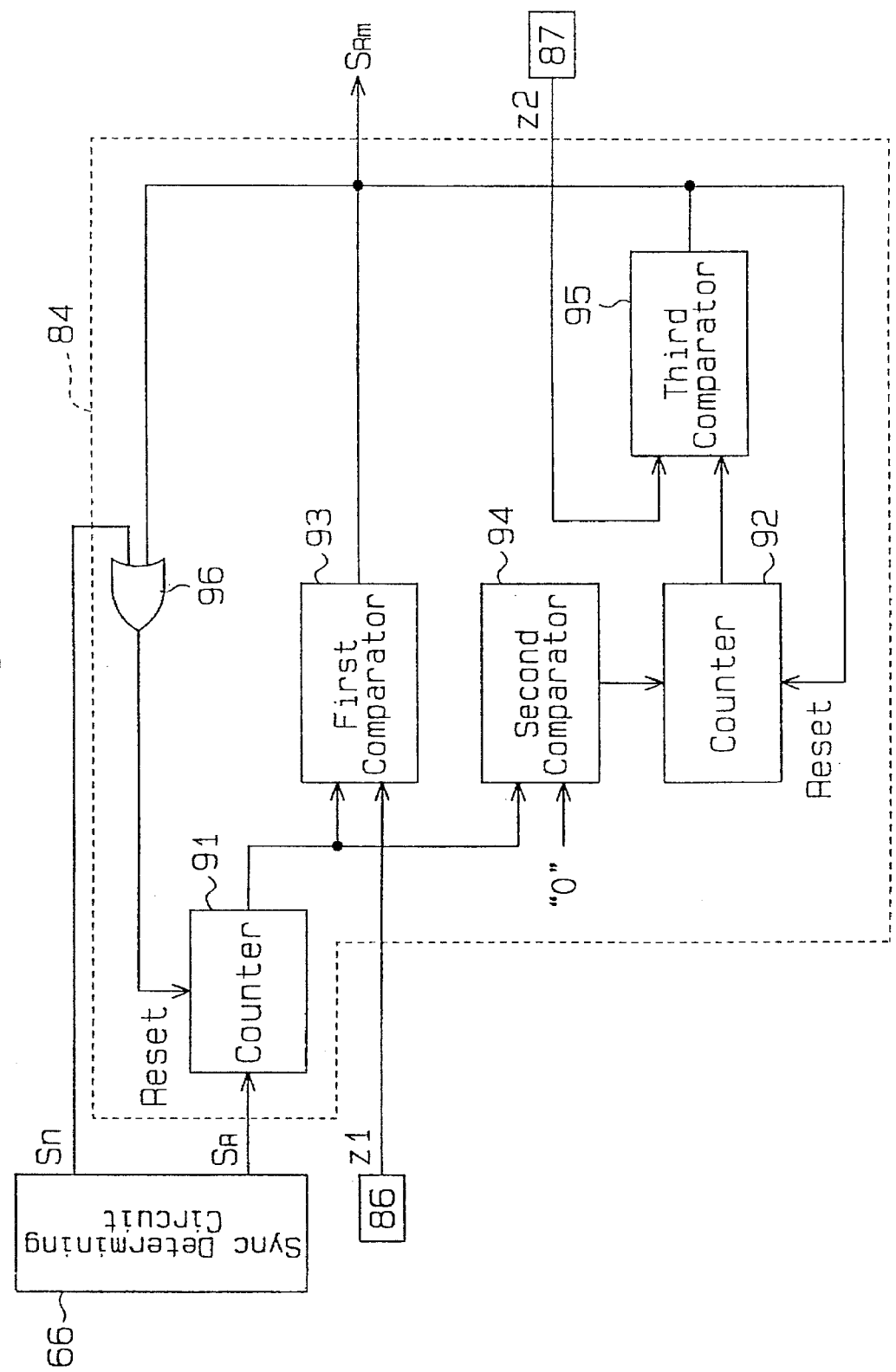
FIG. 8 is a block diagram illustrating a comparator/counter repeat circuit in the controller in FIG. 7.

The repeat circuit 84 generates a control signal $S_{Rm}$ based on individual control signals $S_n$ and $S_R$ and values z1 and z2 respectively set by input devices 86 and 87, as shown in FIG. 6 to FIG. 8. The skip circuit 85 generates a control signal $S_{Sm}$ based on input from 3 sources: individual control signals $S_n$ and $S_S$ produced by the sync determining circuit 66, and values w1 and w2 respectively set by input devices 88 and 89 shown in FIG. 6, FIG. 7 and FIG. 9, and the result of the detection by the picture header detector 63.

The decode core circuit 23 operates in accordance with the individual control signals $S_{Sm}$, $S_n$ and $S_{Rm}$, not the control signals $S_S$, $S_n$ and $S_R$. When the control signal $S_{Sm}$ is produced, the decode core circuit 23 performs the skip operation. When the control signal $S_n$ is produced, the decode core circuit 23 performs the normal operation. When the control signal $S_{Rm}$ is produced, the decode core circuit 23 performs the repeat operation.

FIG. 8 shows the block circuit of the repeat circuit 84, which comprises counters 91 and 92, first to third comparators 93 to 95, and an OR gate 96. The counter 91 increments the count value every time the control signal $S_R$ is generated. The first comparator 93 compares the count value of the counter 91 with the value z1 and produces the control signal $S_{Rm}$ when the count value is greater than z1. The OR gate 96 outputs a reset signal to the counter 91 when at least one of the control signals $S_n$ and $S_{Rm}$ is generated. The counter 91 resets the count value in response to the reset signal.

When the count value of the counter 91 is greater than zero, the second comparator 94 outputs a count start signal to the counter 92. The counter 92 starts counting in response to the count start signal and increments the count value. The third comparator 95 compares the count value of the counter 92 with the value z2. When the count value is greater than z2, the third comparator 95 produces the control signal $S_{Rm}$ and outputs a reset signal to the counter 92. The counter 92 resets the count value in response to this reset signal.

When the count value of the counter 91 shows the control signal $S_R$ having been generated consecutively by the number larger than the value z1, the first comparator 93 generates the control signal $S_{Rm}$. If the control signal $S_R$ has not been generated consecutively by the number larger than the value z1, the decode core circuit 23 will not execute the repeat operation. This scheme is particularly advantageous due to the fact that the sync determining circuit 66 may erroneously generate the control signal $S_R$ causing the decode core circuit 23 to function in a repeat mode even if the reproduction timing of the video output is not leading the audio output. When the PTS(A) or PTS(V) is in error or when a moving picture is reproduced faster than the normal reproduction speed, for example, the sync determining circuit 66 may erroneously generate the control signal $S_R$.

The repeat circuit 84 determines that the control signal $S_R$ is accurate when the sync determining circuit 66 has consecutively generated the control signal $S_R$ more than a given number of times (=z1), and produces the control signal $S_{Rm}$. The decode core circuit 23 performs the repeat operation in accordance with the control signal $S_{Rm}$. The generation of the control signal $S_{Rm}$ in this manner prevents the decode core circuit 23 from executing the repeat operation in accordance with an erroneous control signal $S_R$.

When the control signal $S_R$ is generated once, the counter 92 starts the counting operation and the third comparator 95 generates the control signal $S_{Rm}$ a given period of time later, regardless of the count value of the counter 91 then. This given period of time is determined by the incrementing speed of the counter 92 and the value z2. Following a given period of time after the generation of the control signal $S_R$ from the sync determining circuit 66, the decode core circuit 23 executes the repeat operation. This is advantageous because the control signal $S_R$, even if it is correct, is not always consecutively generated more than a given number of times (z1). When a given period of time passes after the generation of the control signal $S_R$, therefore, the repeat determining circuit 84 determines that the control signal $S_R$ is correct, and produces the control signal $S_{Rm}$. The decode core circuit 23 executes the repeat operation in accordance with the control signal $S_{Rm}$. The above-described operations of the second and third comparators 94 and 95 and the counter 92 compensate for the operations of the counter 91, the first comparator 93 and the OR gate 96 to more reliably generate the control signal $S_{Rm}$.

Figure 9:
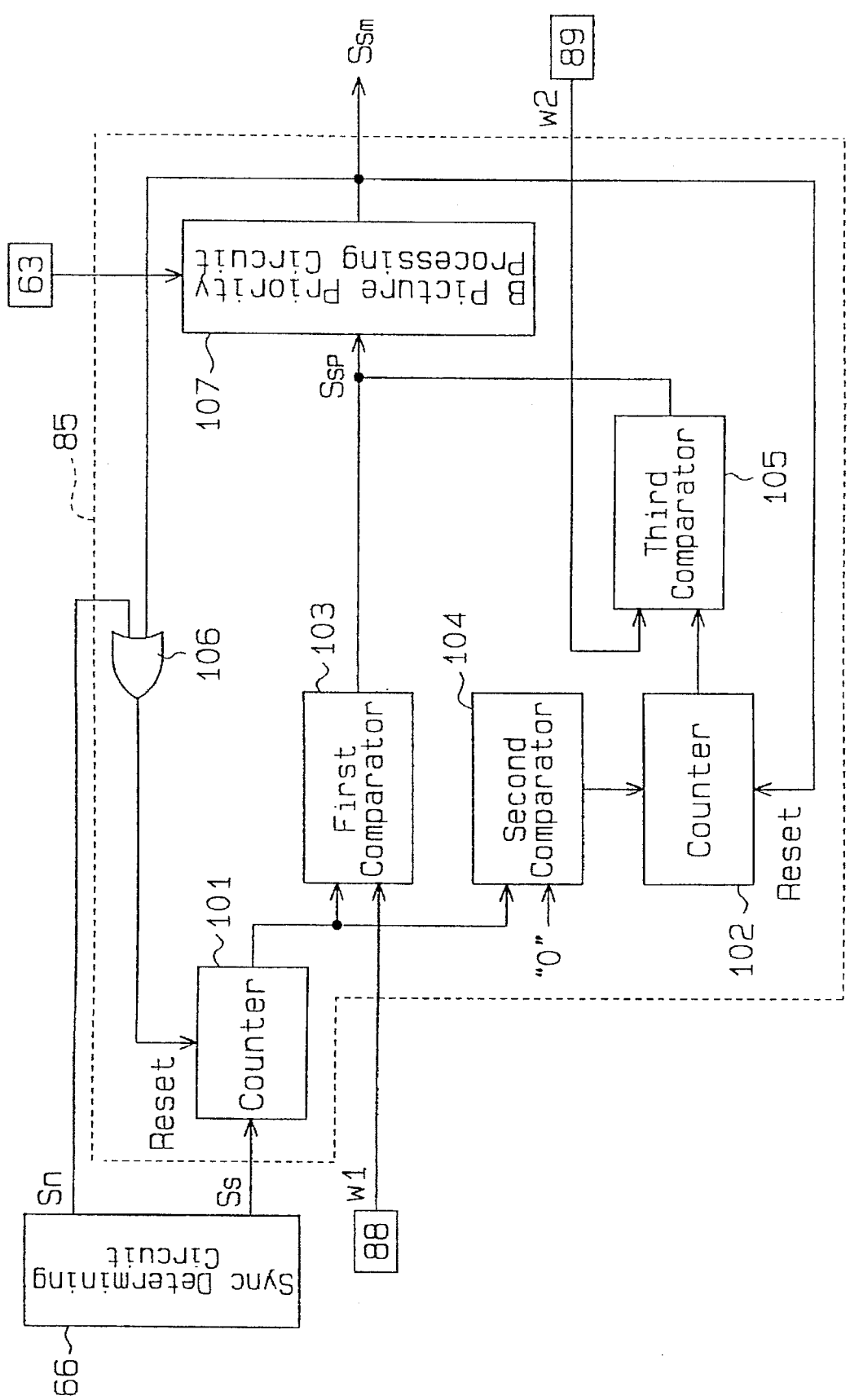
FIG. 9 is a block diagram illustrating a comparator/counter skip circuit in the controller in FIG. 7.

FIG. 9 shows the block circuit of the skip circuit 85, which comprises counters 101 and 102, first to third comparators 103 to 105, an OR gate 106, and a B picture priority processing circuit 107.

The counter 101 increments the count value every time the control signal $S_S$ is generated. The first comparator 103 compares the count value of the counter 101 with the value w1 and produces the control signal $S_{Sp}$ when the count value is greater than w1. When the count value of the counter 101 is greater than zero, the second comparator 104 outputs a count start signal to the counter 102. The counter 102 starts counting in response to the count start signal and increments the count value. The third comparator 105 compares the count value of the counter 102 with the value w2, and produces the control signal $S_{Sp}$ when the count value is greater than w2.

The B picture priority processing circuit 107 generates a control signal $S_{Sm}$ in accordance with the control signal $S_{Sp}$ and the picture type (I, P, B) detected by the picture header detector 63. This control signal $S_{Sm}$ causes the decode core circuit 23 to perform the skip operation with higher priority on a B picture than on an I or P picture. The OR gate 106 outputs a reset signal to the counter 101 when at least one of the control signals $S_n$ and $S_{Sm}$ is generated. The counter 101 resets the count value in response to the reset signal. The counter 102 resets the count value when the control signal $S_{Sm}$ is generated.

When the count value of the counter 101 is larger than the value w1, the first comparator 103 generates the control signal $S_{Sp}$. The B picture priority processing circuit 107 generates the control signal $S_{Sm}$ in accordance with the control signal $S_{Sp}$ and the picture type (I, P, B). If the number of consecutively generated control signals $S_S$ is equal to or smaller than the value w1, the decode core circuit 23 will not operate in a skipping mode. Because, it is possible for the sync determining circuit 66 to erroneously generate the control signal $S_S$, for example, even when the video output timing lags the audio output timing, when the PTS (A) or PTS (V) is in error or when a moving picture is reproduced faster than the normal reproduction speed.

The skip circuit 85 consequently determines that the control signal $S_S$ is accurate when the sync determining circuit 66 generates a consecutive number of control signals $S_S$ for more than a given number of times (w1) and generate control signal $S_{Sp}$. The decode core circuit 23 performs the skip operation in accordance with the control signal $S_{Sp}$. The generation of the control signal $S_{Sp}$ in this manner prevents the decode core circuit 23 from executing the skip operation in accordance with the erroneous control signal $S_S$.

Since a B picture is produced using bidirectional prediction technique, its data size is relatively small. Consequently, a B picture has less significance than that of an I picture or a P picture. The skip reproduction of a B picture, therefore, can reduce the number of frame drops from the reproduced moving picture.

When the control signal $S_S$ is generated once, the counter 102 starts the counting operation and the third comparator 105 generates the control signal $S_{Sp}$ a given period of time later, regardless of the count value of the counter 101 then. This given period of time is determined by the incrementing speed of the counter 102 and the value w2. Following a given period of time passes after the generation of the control signal $S_S$ from the sync determining circuit 66, the decode core circuit 23 decodes utilizing a skipping mode of operation. This approach has been taken because the control signal $S_S$, even if it is correct, is not always consecutively generated more than a given number of times (w1). When a given period of time passes after the generation of the control signal $S_S$, therefore, the skip circuit 85 determines that the control signal $S_S$ is correct, and produces the control signal $S_{Sp}$. The decode core circuit 23 executes the skip operation in accordance with the control signal $S_{Sp}$. The above-described operations of the second and third comparators 104 and 105 and the counter 102 compensate for the operations of the counter 101, the first comparator 103 and the OR gate 106 to accurately generate the control signal $S_{Sp}$.

According to this embodiment, even when the control signals $S_R$ and $S_S$ are erroneously generated due to some reasons, the repeat circuit 84 and skip circuit 85 compensate the control signals $S_R$ and $S_S$ to generate the control signals $S_{Rm}$ and $S_{Sm}$, respectively. The decode core circuit 23 performs its operation (skip or repeat operation only) in accordance with the control signal $S_{Rm}$ or $S_{Sm}$. Even if the erroneous control signals $S_R$ and $S_S$ is erroneously generated, accurate synchronization of the audio with the video output can be obtained.

The setting of the individual values z1, z2, w1 and w2 by the user operating the input devices 86 to 89 can permit the adjustment of compensation for the individual control signals $S_R$ and $S_S$. The skipping of a B picture will occur before the pictures I and P are skipped, due to the lower significance of B picture compared to an I or P picture. Consequently, the number of frame dropped from the reproduced video will be reduced, smoothing the appearance and improving the quality of the reproduced image.

Although three embodiments of the present invention have been described herein, it should be apparent to those skilled in the art that the present invention may be embodied in many other specific forms without departing from the spirit or scope of the invention. Particularly, it should be understood that the present invention may be modified in the following modes.

In the second and third embodiments, the sampling frequency detector 53 and the adder 54 may be omitted. In this case, the time stamp generator 41 does not generate an $A_2$-PTS in real time and the precision of the generation of a $V_2$-PTS by the second subtracter 69 decreases. It is however possible to accurately synchronize an audio output with a video output. Affixing of a large number of PTS(A)'s in an audio stream ensures the generation of a large number of $A_2$-PTS's. Consequently, even without the detector 53 and the adder 54, substantially the same performance can be obtained in this case as that of the second and third embodiments.

Figure 10:
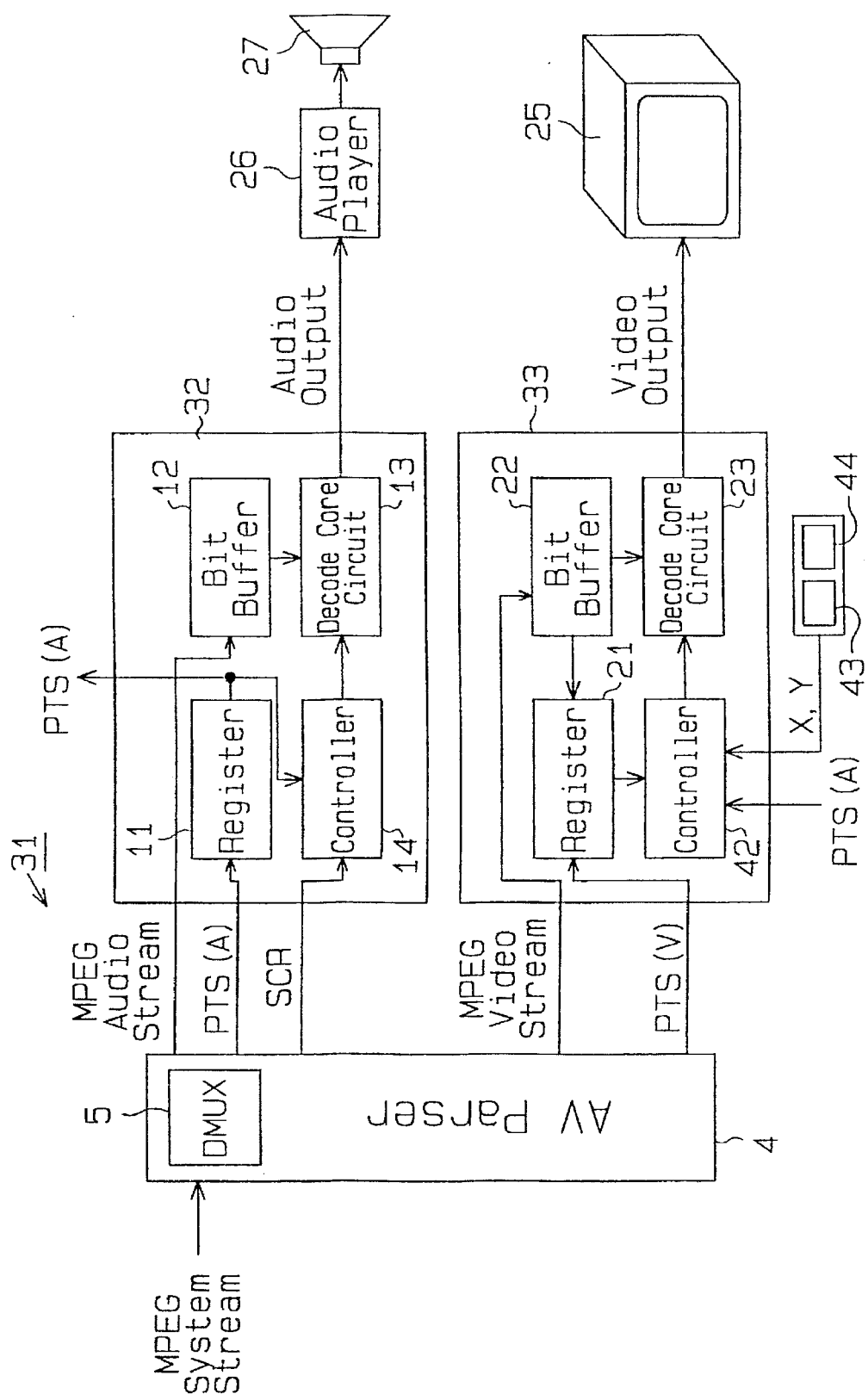
FIG. 10 is a block diagram illustrating an audio/video decoding system according to another embodiment of this invention.

In the second and third embodiments the time stamp generator 41 may be omitted and the audio decoder 32 may output a PTS(A) to the controller 42 as shown in FIG. 10. That is, a $V_1$-PTS instead of an $A_2$-PTS may be subtracted from the PTS(A) by a subtracter 69, thus yielding a $V_2$-PTS. In this case, the PTS(V) is compensated based on the PTS(A), video decode delay time D(t) and value x, to produce $V_2$-PTS. The use of the PTS(A) prevents the reflection of the influence of the internal delay time of the audio decoder 32 on the $V_2$-PTS. But, the reproduction timing for a video output can still be adjusted in accordance with the reproduction timing of the audio output. The small internal delay time of the audio decoder 32 can provide substantially the same performance as that of the second or third embodiment even if the PTS(A) is used. In this case, however, the controller 14 computes the reproduction timing of the audio output based on the internal delay time of the audio decoder 32, the SCR and the PTS(A), and controls the decode core circuit 13 according to the reproduction timing as in the first embodiment.

In the second and third embodiments, the value x may be omitted or the value y may be fixed. In this case, while the functions associated with the individual values x and y are omitted, the other functions and advantages are the same as those of these embodiments.

In the third embodiment, the second and third comparators 94 and 95 and the counter 92 may be omitted from the repeat determining circuit 84. In this case, while the functions associated with the individual circuits 94, 95 and 92 are omitted, the other functions and advantages are the same as those of the third embodiment. The second and third comparators 104 and 105 and the counter 102 may be omitted from the skip determining circuit 85. The B picture priority processing circuit 107 may be omitted from the skip circuit 85. In this case, while the functions associated with the individual circuits 104, 105, 102 and 107 are omitted, the other functions and advantages are the same as those of the third embodiment.

In the second and third embodiments, the register 21 may be constituted of a single-stage stack. Although the number of time stamps PTS(V) increase as the number of stack stages in the register 21 increase, the capacity of the register 21 becomes greater. The number of stack stages of the register 21 may be set in accordance with the circuit scale, cost and the desired performance.

In the third embodiment, when the count values of the individual counters 91 and 101 are greater than a predetermined value equal to or larger than zero, the second comparators 94 and 104 may output the count start signal to the counters 92 and 102.

The PTS may be replaced with the DTS, in which case the same function and advantages as those of the third embodiment can be obtained.

Figure 11:
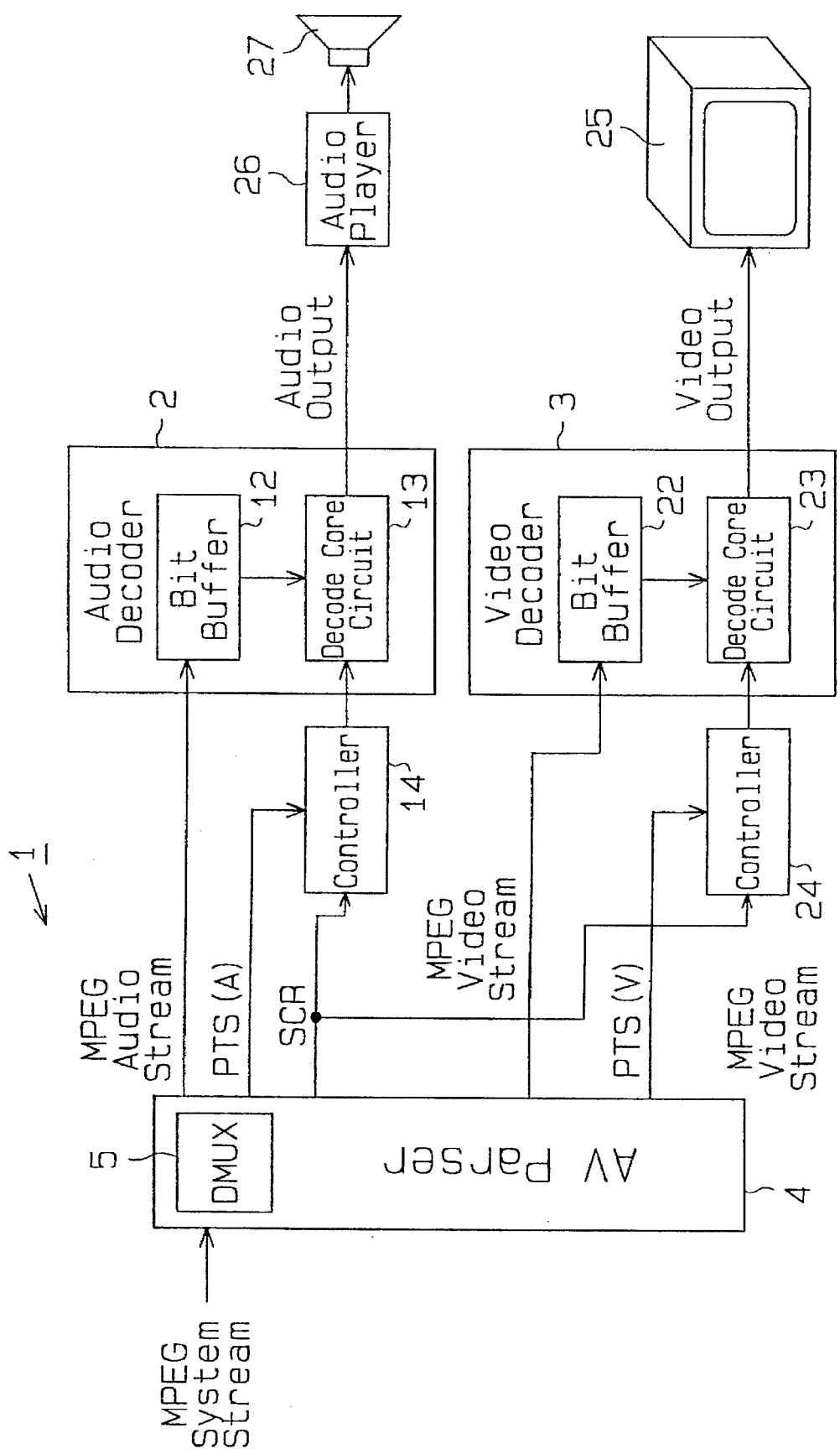
FIG. 11 is a block diagram illustrating an audio/video decoding system according to another embodiment of this invention.

As shown in FIG. 11 illustrating a modification of the first embodiment, the controller 14 may be separated from the audio decoder 2, while the register 11 (not shown) may be separated from the decoder 2 and be incorporated in the AV parser 4. Similarly, the controller 24 may be separated from the video decoder 3, while the register 21 (not shown) may be separated from the decoder 3 and be incorporated in the AV parser 4.

Figure 12:
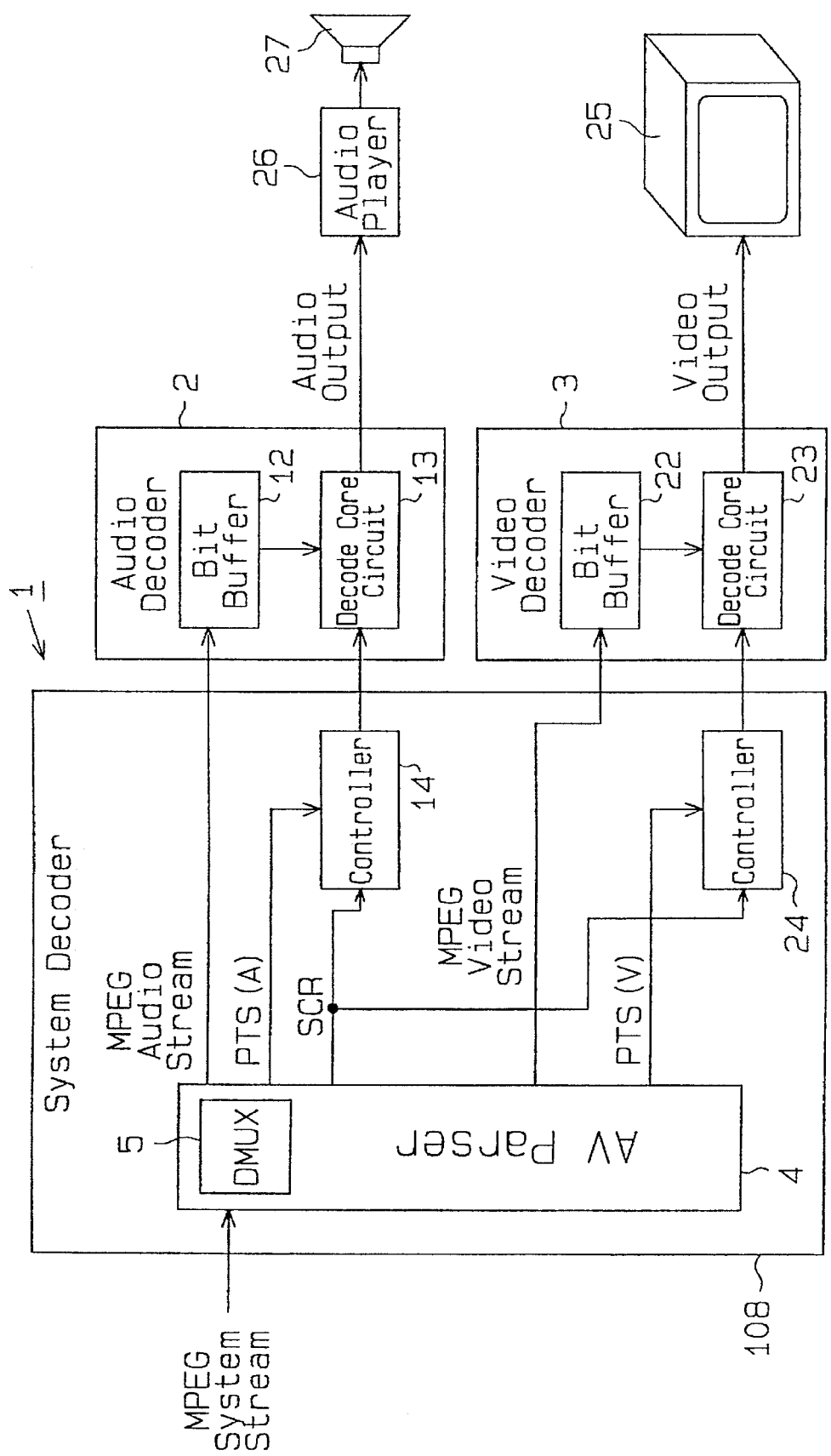
FIG. 12 is a block diagram illustrating an audio/video decoding system according to another embodiment of this invention.

As shown in FIG. 12 illustrating a modification of the first embodiment, the controllers 14 and 24 may be separated from the associated audio and video decoder 2 and 3, respectively. Further, the separated controllers 14 and 24 and the AV parser 4 may form a system decoder 108, which is applicable to a pair of conventional audio and video decoders.

Therefore, the present examples and embodiments are to be considered as illustrative and not restrictive and the invention is not to be limited to the details given herein, but may be modified within the scope of the appended claims.

What is claimed is:

1. A Moving Picture Experts Group (MPEG) compliant audio/video decoding system for decoding a multiplexed system stream of audio and video streams having audio and video time stamps and a system clock reference (SCR) into synchronized audio output and video output from said decoding system, said system comprising:

a parser for extracting audio and video streams, audio and video time stamps, and said SCR from said system stream;

an audio stream processor responsive to the audio stream to decode said audio stream into audio data;

an audio controller responsive to said audio time stamp and SCR for controlling the output of audio data from said audio stream processor based on an audio decoding time of said audio stream processor, said SCR and said audio time stamp;

a video stream processor responsive to the video stream to decode said video stream into video data; and a video controller responsive to video time stamp and SCR for controlling the output of video data from said video stream processor based on a video decoding time of said video stream processor, said SCR and said video time stamp.

2. A Moving Picture Experts Group (MPEG) compliant audio/video decoding system, responsive to a multiplexed system stream of audio and video streams having a system clock reference (SCR), an audio time stamp and a video time stamp, to provide decoded audio data and decoded video data as output from said decoding system, said system comprising:

a parser for extracting the SCR, audio time stamp and video time stamp from the system stream, said parser including a demultiplexer for demultiplexing the audio and video streams from said system stream, wherein said audio stream, video stream, SCR, audio time stamp and video time stamp are provided as outputs from said parser;

an audio stream processor responsive to the audio stream from said parser to decode said audio stream into audio data, said audio data is provided as output from said audio stream processor;

an audio controller, responsive to said SCR and said audio time stamp provided by said parser, for computing an audio decoding time based on an internal operational delay time of said audio stream processor, and for controlling the output of the audio data from said audio stream processor based on said audio decoding time, said SCR and said audio time stamp;

a video stream processor responsive to the video stream from said parser to decode said video stream into video data, said video data is provided as output from said video stream processor; and a video controller, responsive to said SCR and said video time stamp provided by said parser, for computing a video decoding time based on an internal operational delay time of said video stream processor, and for controlling the output of the video data from said video stream processor based on said video decoding time, said SCR and said video time stamp.

3. The decoding system according to claim 2, wherein said audio stream processor includes:

an audio buffer for temporarily holding said audio stream output from said parser; and an audio decode core circuit for decoding said audio stream held in said audio buffer; and wherein said video stream processor includes:

a video buffer for temporarily holding said video stream output from said parser; and a video decode core circuit for decoding said video stream held in said video buffer.

4. The decoding system according to claim 3, wherein the internal operational delay time of said audio stream processor is set as the sum of the internal delay time of said audio buffer and audio decode core circuit; and wherein the internal operational delay time of said video stream processor is set as the sum of the internal delay time of said video buffer and video decode core circuit.

5. A Moving Picture Experts Group (MPEG) compliant audio/video decoding system for decoding a multiplexed system stream of audio and video streams having audio and video time stamps and a system clock reference (SCR) into synchronized audio output and video output from said decoding system, said system comprising:

a parser for extracting audio and video streams, audio and video time stamps, and said SCR from said system stream:

an audio stream processor responsive to the audio stream to decode said audio stream into audio data;

an audio controller responsive to said audio time stamp and SCR for controlling the output of audio data from said audio stream processor based on, said SCR and said audio time stamp;

an video stream processor responsive to the video stream to decode said video stream into video data; and a video controller responsive to video time stamp and audio time stamp for controlling the output of video data from said video stream processor based on a video decoding time of said video stream processor, an audio decoding time of said audio stream processor, said audio time stamp and said video time stamp.

6. A Moving Picture Experts Group (MPEG) compliant audio/video decoding system, responsive to a multiplexed system stream of audio and video streams with a system clock reference (SCR), an audio time stamp and a video time stamp, to provide decoded audio data and decoded video data synchronized with said audio data as outputs from said decoding system, said system comprising:

a parser for extracting the SCR, audio time stamp and video time stamp from the system stream, said parser including a demultiplexer for demultiplexing the audio and video streams from said system stream, wherein said audio stream, video stream, SCR, audio time stamp and video time stamp are provided as outputs from said parser;

an audio stream processor responsive to the audio stream from said parser to decode said audio stream into audio data, said audio data is provided as output from said audio stream processor;

an audio controller, responsive to said SCR and said audio time stamp provided by said parser for controlling the output of the audio data from said audio stream processor based on said SCR and said audio time stamp;

a time stamp generator, responsive to said audio time stamp from said parser, for computing an audio decoding time based on an internal operational delay time of said audio stream processor, and for generating a first time stamp based on the computed decoding time and said audio time stamp;

a video stream processor responsive to the video stream from said parser to decode said video stream into video data said video data is provided as output from said video stream processor; and a video controller, responsive to said video time stamp provided from said parser and to the first time stamp generated by said time stamp generator, for computing a video decoding time based on an internal operational delay time of said video stream processor, and for controlling the output of the video data from said video stream processor based on said video time stamp said computed video decoding time and said first time stamp.

7. The decoding system according to claim 6, wherein said audio time stamp includes a presentation time stamp indicating an output timing of said audio output and a decoding time stamp indicating a decoding start timing of said audio stream; and said video time stamp includes a presentation time stamp indicating an output timing of said video output and a decoding time stamp indicating a decoding start timing of said video stream.

8. The decoding system according to claim 6, wherein said audio stream processor includes:

an audio register for receiving and temporarily holding said audio time stamp, and for providing said audio time stamp for said audio controller and said time stamp generator;

an audio buffer for temporarily holding said audio stream output from said parser; and an audio decode core circuit for decoding said audio stream held in said audio buffer; and wherein said video stream processor includes:

a video register for receiving and temporarily holding said video time stamp, and for providing said video time stamp for said video controller;

a video buffer for temporarily holding said video stream output from said parser; and a video decode core circuit for decoding said video stream held in said video buffer.

9. The decoding system according to claim 8, wherein said time stamp generator computes a sum of an internal delay time of said audio buffer and an internal delay time of said audio decode core circuit, said sum being considered as a decoding time of said audio stream processor; and said video controller computes a sum of an internal delay time of said video buffer and an internal delay time of said video decode core circuit, said sum being considered as a decoding time of said video stream processor.

10. The decoding system according to claim 8, wherein said time stamp generator includes:

a delay time calculator for computing said internal delay time of said audio buffer; and an audio subtracter for subtracting a sum of said internal delay time of said audio buffer and said internal delay time of said audio decode core circuit from said audio time stamp to produce said first time stamp.

11. The decoding system according to claim 10, wherein said time stamp generator includes:

a sampling frequency detector for detecting a sampling frequency from said audio stream held in said audio buffer and generating a clock signal corresponding to said sampling frequency; and an adder for adding a primary first time stamp produced by said audio subtracter and said clock signal to produce a secondary first time stamp.

12. The decoding system according to claim 11, wherein said sampling frequency is 44.1 kHz.

13. The decoding system according to claim 8, wherein said video controller includes:

a mapping processor for mapping said video time stamp and a picture included in said video stream to obtain an internal operational delay time of said video buffer; and a generator for generating a signal for controlling an output timing based on said internal delay time of said video decode core circuit, said video time stamp and said first time stamp in such a way as to cause said video decode core circuit to perform a skip operation or a repeat operation, wherein said video decode core circuit abandons a picture included in said video stream held in said video buffer in accordance with a skip control signal and repeats video outputting of said picture in accordance with a repeat control signal.

14. The decoding system according to claim 13, further comprising a repeat determining circuit for determining if said repeat control signal generated by said generator is effective, and for generating a new repeat control signal for a repeat operation when said repeat control signal is effective.

15. The decoding system according to claim 14, wherein said repeat determining circuit includes:

a counter for counting a number of consecutive generations of said repeat control signal; and a comparator for comparing a count value of said counter with a value set by an input device, and generating a new repeat control signal when said count value is greater than said set value, said counter resetting said count value to zero when said comparator generates said new repeat control signal.

16. The decoding system according to claim 14, wherein said repeat determining circuit includes:

a counter for starting a counting operation when said repeat control signal is generated by a predetermined number of times; and a comparator for comparing a count value of said counter with a value set by an input device, and generating a new repeat control signal when said count value is greater than said set value, said counter resetting said count value to zero when said comparator generates said new repeat control signal.

17. The decoding system according to claim 13, wherein said generator generates a normal-operational control signal for controlling an output timing so as to cause said video decode core circuit to perform a normal operation; and said video decode core circuit decodes said video stream held in said video buffer in a normal manner in accordance with said normal-operation control signal.

18. The decoding system according to claim 17, further comprising:

a repeat determining circuit for determining if said repeat control signal generated by said generator is effective, and generating a new repeat control signal when said repeat control signal is effective; and a skip determining circuit for determining if said skip control signal generated by said generator is effective, and generating a new skip control signal when said skip control signal is effective;

wherein said repeat determining circuit stops generating said new repeat control signal when said normal-operation control signal is generated by said generator; and said skip determining circuit stops generating said new skip control signal when said normal-operation control signal is generated by said generator.

19. The decoding system according to claim 18, wherein said repeat determining circuit includes:

a first counter for counting a number of consecutive generations of said repeat control signal;

a first comparator for comparing a count value of said first counter with a value set by an input device, and generating a new repeat control signal when said count value is greater than said set value;

a second comparator for generating a count start signal when said count value of said first counter is greater than a predetermined value;

a second counter for starting a counting operation in response to said count start signal; and a third comparator for comparing a count value of said second counter with a value set by an input device, and generating a new repeat control signal when said count value is greater than said set value, said first counter resetting said count value to zero when said generator generates said normal-operation control signal or one of said first and third comparators generates said new repeat control signal during counting, said second counter resetting said count value to zero when said third comparator generates said new repeat control signal.

20. The decoding system according to claim 18, wherein said skip determining circuit includes:

a first counter for counting a number of consecutive generations of said skip control signal;

a first comparator for comparing a count value of said first counter with a value set by an input device, and generating a new skip control signal when said count value is greater than said set value;

a second comparator for generating a count start signal when said count value of said first counter is greater than a predetermined value;

a second counter for starting a counting operation in response to said count start signal; and a third comparator for comparing a count value of said second counter with a value set by an input device, and generating a new skip control signal when said count value is greater than said set value, said first counter resetting said count value to zero when said generator generates said normal-operation control signal or one of said first and third comparators generates said new skip control signal during counting, said second counter resetting said count value to zero when said third comparator generates said new skip control signal.

21. The decoding system according to claim 13, wherein said mapping processor includes:

a write address detector for detecting an address of a video time stamp on an assumption that said video stream held in said video buffer is affixed with said video time stamp, said address being temporarily held in association with said video time stamp in said video register;

a read address detector for detecting and address of said video stream read from said video buffer;

a picture header detector for extracting a picture header from a head of each picture in said video stream held in said video buffer, and for detecting a picture type defined in said picture header;

a first comparator for comparing said address of said video stream read from said video buffer with said address associated with said video time stamp and read from said video register, and determining if both addresses coincide with each other; and a mapping circuit for mapping said video time stamp and a picture based on a result of determination by said first comparator and a result of detection by said picture header detector.

22. The decoding system according to claim 21, wherein said generator includes:

a first register for temporarily holding said video time stamp and exchanging a video time stamp associated with an I picture or a P picture with a video time stamp associated with a B picture, based on said picture type detected by said picture header detector;

a video subtracter for subtracting said internal delay time of said video decode core circuit and said video time stamp held in said first register from said first time stamp to produce a second time stamp;

a second comparator for comparing a first value set by an input device with said second time stamp; and a sync determining circuit for generating said control signals after execution of mapping by said mapping circuit, based on a result of comparison by said second comparator.

23. The decoding system according to claim 22, wherein said first value is set greater than a half of a reproduction time of one picture.

24. The decoding system according to claim 22, wherein said video subtracter includes:

a first video subtracter subtracting a sum of said internal delay time of said video decode core circuit and a second value set by an input device from said video time stamp held in said first register, thereby producing a primary second time stamp; and a second video subtracter for subtracting said primary second time stamp from said first time stamp to produce a secondary second time stamp.

25. The decoding system according to claim 13, further comprising a skip determining circuit for determining if said skip control signal generated by said generator is effective, and generating a new skip control signal when said skip control signal is effective.

26. The decoding system according to claim 25, wherein said skip determining circuit includes:
- a counter for counting a number of consecutive generations of said skip control signal; and
- a comparator for comparing a count value of said counter with a value set by an input device, and generating a new skip control signal when said count value is greater than said set value,
- said counter resetting said count value to zero when said comparator generates said new skip control signal.

27. The decoding system according to claim 25, wherein said skip determining circuit includes:
- a counter for starting a counting operation when said skip control signal is generated by a predetermined number of times; and
- a comparator for comparing a count value of said counter with a value set by an input device, and generating a new skip control signal when said count value is greater than said set value,
- said counter resetting said count value to zero when said comparator generates said new skip control signal.

28. The decoding system according to claim 25, wherein said mapping processor includes a picture header detector for extracting a picture header from a head of each picture in said video stream written in said video buffer and detecting a picture type defined in said picture header; and
- said skip determining circuit includes a priority processing circuit for generating a skip control signal to skip a B picture with a priority over an I picture and a P picture based on said new skip control signal and said picture type detected by said picture header detector.

29. A Moving Picture Experts Group (MPEG) compliant audio/video decoding system, responsive to a multiplexed system stream of audio and video streams with a system clock reference (SCR), an audio time stamp and a video time stamp, to provide decoded audio data and decoded video data synchronized with said audio data as outputs from said decoding system, said system comprising:
- a parser for extracting the SCR, audio time stamp and video time stamp from the system stream, said parser including a demutiplexer for demultiplexing the audio and video streams from said system stream, wherein said audio stream, video stream, SCR, audio time stamp and video time stamp are provided as outputs from said parser;
- an audio stream processor responsive to the audio stream from said parser to decode said audio stream into audio data, said audio data is provided as output from said audio stream processor;
- an audio controller, responsive to said SCR and said audio time stamp provided by said parser, for controlling the output of the audio data from said audio stream processor based on said SCR and said audio time stamp;
- a video stream processor responsive to the video stream from said parser to decode said video stream into video data, said video data being provided as output from said video stream processor; and
- a video controller, responsive to said audio time stamp and said video time stamp provided by said parser, for computing a video decoding time based on an internal operational delay time of said video stream processor, and for controlling the output of the video data from said video stream processor based on said video decoding time, said audio time stamp and said video time stamp.

30. A Moving Picture Experts Group (MPEG) compliant audio decoder for use in an audio/video decoding system, said audio decoder being responsive to an audio stream, a system clock reference (SCR) and audio time stamp to produce decoded audio data, said audio decoder comprising:
- an audio stream processor responsive to the audio stream to decode said audio stream into audio data, said audio data is provided as output from said audio stream processor; and
- an audio controller, responsive to said SCR and said audio time stamp, for computing an audio decoding time based on an internal operational delay time of said audio stream processor, and for controlling the output of the audio data from said audio stream processor based on said audio decoding time, said SCR and said audio time stamp.

31. The audio decoder according to claim 30, wherein said audio stream processor includes:
- a buffer for temporarily holding said audio stream; and
- a decode core circuit for decoding said audio stream held in said buffer.

32. The audio decoder according to claim 31, wherein said audio controller computes a sum of an internal delay time of said buffer and an internal delay time of said decode core circuit, said sum being considered as a decoding time of said audio stream processor.

33. A Moving Picture Experts Group (MPEG) compliant video decoder for use in an audio/video decoding system, said video decoder being responsive to a video stream, a system clock reference (SCR) and a video time stamp to produce decoded video data, the video decoder comprising:
- a video stream processor responsive to the video stream to decode said video stream into video data, said video data is provided as output from said video stream processor; and
- a video controller, responsive to said SCR and said video time stamp, for computing an video decoding time based on an internal operational delay time of said video stream processor, and for controlling the output of the video data from said video stream processor based on said video decoding time, said SCR and said video time stamp.

34. The video decoder according to claim 33, wherein said video stream processor includes:
- a buffer for temporarily holding said video stream; and
- a decode core circuit for decoding said video stream held in said buffer.

35. The video decoder according to claim 34, wherein said video controller computes a sum of an internal delay time of said buffer and an internal delay time of said decode core circuit, said sum being considered as a decoding time of said video stream processor.

36. A Moving Picture Experts Group (MPEG) compliant system decoder for use in an audio/video decoding system, said system decoder being responsive to a multiplexed system stream of audio and video streams having system clock reference (SCR), audio time stamp and video time stamp, to provide an audio decoder with said audio stream and to provide a video decoder with said video stream, the system decoder comprising:

a parser for extracting the SCR, audio time stamp and video time stamp from the system stream, said parser including a demultiplexer for demultiplexing the audio and video streams from said system stream, wherein said audio stream, video stream, SCR, audio time stamp and video time stamp are provided as outputs from said parser;

an audio controller, responsive to said SCR and audio time stamp provided by said parser, for computing an audio decoding time based on an internal operational delay time of said audio decoder, and for controlling said audio decoder based on said audio decoding time, said SCR and said audio time stamp; and an video controller, responsive to said SCR and video time stamp provided by said parser, for computing a video decoding time based on an internal operational delay time of said video decoder, and for controlling said video decoder based on said video decoding time, said SCR and said video time stamp.

37. A method for synchronizing the output of audio and video data from an audio/video decoding system compliant with Moving Picture Experts Group (MPEG) standards, said audio/video decoding system operating to decode an system stream into audio data and video data, said system stream including audio and video streams multiplexed with a System Clock Reference (SCR), an audio time stamp and a video time stamp, the method comprising the steps of:

extracting said SCR, said audio time stamp and said video time stamp from said system stream;

demultiplexing the system stream into an audio stream and video stream;

computing an audio decoding time, as the time needed to decode audio data from said audio stream;

timing the output of said audio data from said decoding system based on the audio decoding time, said SCR and said audio time stamp;

computing an video decoding time, as the time needed to decode video data from said video stream; and timing the output of said video data from said decoder based on the video decoding time, said SCR and said video time stamp.

38. A method for synchronizing the output of audio and video data from an audio/video decoding system compliant with Moving Picture Experts Group (MPEG) standards, said audio/video decoding system operating to decode a system stream into audio data and video data, said system stream including audio and video streams multiplexed with a System Clock Reference (SCR), an audio time stamp and a video time stamp, the method comprising the steps of:

extracting said SCR, said audio time stamp and said video time stamp from said system stream;

demultiplexing the system stream into an audio stream and video streams;

computing an audio decoding time, as the time needed to decode audio data from said audio stream;

timing the output of said audio data from said decoding system based on said SCR and said audio time stamp;

generating a first time stamp based on said audio decoding time and said audio time stamp;

computing an video decoding time, as the time needed to decode video data from said video stream; and timing the output of said video data from said decoding system based on the video decoding time, said video time stamp and said first time stamp.

39. The method according to claim 38, wherein said step of generating said first time stamp includes the steps of:

generating a primary first time stamp based on said computed decoding time and said audio time stamp;

detecting a sampling frequency from said audio stream;

generating a clock signal corresponding to said detected sampling frequency; and adding said clock signal to said primary first time stamp to produce a secondary first time stamp.

40. The method according to claim 38, further comprising the step of receiving and temporarily holding said video stream before computing said video decoding time; and wherein said step for computing said video decoding time includes the steps of:

mapping said video time stamp and a picture included in said video stream to obtain a delay time originated from holding of said video stream; and wherein said timing the output of said video data include the step of:

generating a control signal for one of skip and repeat operations based on the video decoding time said video stream, said video time stamp and said first time stamp.

41. The method according to claim 40, wherein said step of generating said control signal includes the steps of:

generating a second time stamp based on said video decoding time, said video time stamp and said first time stamp; and comparing said generated second time stamp with a previously set value and generating a skip control signal or a repeat control signal in accordance with a result of comparison.

42. The method according to claim 40, further comprising the steps of:

determining if, after generation of said skip control signal, there is a consecutiveness in said generation of said skip control signal; and generating a new skip control signal when it is determined that there is a consecutiveness in said generation of said skip control signal.

43. The method according to claim 40, further comprising the steps of:

determining if, after generation of said repeat control signal, there is a consecutiveness in said generation of said repeat control signal; and generating a new repeat control signal when it is determined that there is a consecutiveness in said generation of said repeat control signal.

44. The method according to claim 40, further comprising the steps of:

counting a time after generation of said skip control signal, for a predetermined time; and generating a new skip control signal when said predetermined time passes.

45. The method according to claim 40, further comprising the steps of:

counting a time after generation of said repeat control signal, for a predetermined time; and generating a new repeat control signal when said predetermined time passes.

46. The method according to claim 40, further comprising the steps of:

determining if, after generation of said skip control signal, there is a consecutiveness in said generation of said skip control signal;

generating a new skip control signal when it is determined that there is a consecutiveness in said generation of said skip control signal;

counting a time after generation of said skip control signal, for a predetermined time; and generating a new skip control signal when said predetermined time passes.

47. The method according to claim 40, further comprising the steps of:

determining if, after generation of said repeat control signal, there is a consecutiveness in said generation of said repeat control signal;

generating a new repeat control signal when it is determined that there is a consecutiveness in said generation of said repeat control signal;

counting a time after generation of said repeat control signal, for a predetermined time; and generating a new repeat control signal when said predetermined time passes.

48. The method according to claim 47, further comprising the steps of:

extracting a picture header from a head of each picture in said video stream;

detecting a picture type defined in said picture header; and generating a skip control signal to skip a B picture with a priority over an I picture and a P picture based on said new skip control signal and said picture type.

49. A method for synchronizing the output of audio and video data from an audio/video decoding system compliant with Moving Picture Experts Group (MPEG) standards, said audio/video decoding system operating to decode a system stream into audio data and video data, said system stream including audio and video streams multiplexed with a System Clock Reference (SCR), an audio time stamp and a video time stamp, the method comprising the steps of:

extracting said SCR, said audio time stamp and said video time stamp from said system stream;

demultiplexing the system stream into an audio stream and video streams;

computing an audio decoding time, as the time needed to decode audio data from said audio stream;

timing the output of said audio data from said decoding system based on the audio decoding time, said SCR and said audio time stamp;

computing an video decoding time, as the time needed to decode video data from said video stream; and timing the output of said video signal from said decoder based on the video decoding time, said video time stamp and said audio time stamp.

* * * * *